United States Patent
Takeda

(10) Patent No.: US 11,686,810 B2
(45) Date of Patent: Jun. 27, 2023

(54) RADAR APPARATUS, RADAR CONTROL APPARATUS, AND RADAR SYSTEM

(71) Applicant: SONY CORPORATION, Tokyo (JP)

(72) Inventor: Takahiro Takeda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 304 days.

(21) Appl. No.: 17/044,984

(22) PCT Filed: Mar. 15, 2019

(86) PCT No.: PCT/JP2019/010852
§ 371 (c)(1),
(2) Date: Oct. 2, 2020

(87) PCT Pub. No.: WO2019/198420
PCT Pub. Date: Oct. 17, 2019

(65) Prior Publication Data
US 2021/0165071 A1   Jun. 3, 2021

(30) Foreign Application Priority Data

Apr. 11, 2018 (JP) .................................. 2018-075865

(51) Int. Cl.
*G01S 7/02* (2006.01)
*G01S 7/03* (2006.01)
(Continued)

(52) U.S. Cl.
CPC ................ *G01S 7/025* (2013.01); *G01S 7/03* (2013.01); *G01S 13/003* (2013.01); *G01S 13/931* (2013.01)

(58) Field of Classification Search
CPC .......... G01S 7/025; G01S 7/03; G01S 13/003; G01S 13/931
See application file for complete search history.

(56) References Cited

U.S. PATENT DOCUMENTS

| 4,035,797 A | * | 7/1977 | Nagy | ..................... G01S 7/025 |
| | | | | 342/361 |
| 4,329,687 A | * | 5/1982 | Kloevekorn | ............ G01S 7/026 |
| | | | | 342/136 |

(Continued)

FOREIGN PATENT DOCUMENTS

| JP | 2001-330661 | 11/2001 |
| JP | 2006-133108 | 5/2006 |

(Continued)

OTHER PUBLICATIONS

International Search Report and Written Opinion prepared by the Japanese Patent Office dated Apr. 19, 2019, for International Application No. PCT/JP2019/010852.

*Primary Examiner* — Peter M Bythrow
(74) *Attorney, Agent, or Firm* — Sheridan Ross P.C.

(57) ABSTRACT

A radar apparatus according to the present disclosure includes: a transmission unit configured to transmit radio waves; a reception unit including a first receiver configured to receive a first reflected radio wave and a second receiver configured to receive a second reflected radio wave, the first reflected radio wave and the second reflected radio wave having different polarization characteristics from each other and being included in reflected radio waves that are the radio waves reflected by a detection target; and a control unit configured to control operations of the transmission unit and the reception unit, and configured to identify the detection target on the basis of the operation of the transmission unit, a first reception level at the first receiver, and a second reception level at the second receiver.

18 Claims, 22 Drawing Sheets

(51) Int. Cl.
   *G01S 13/00*      (2006.01)
   *G01S 13/931*     (2020.01)

(56) References Cited

U.S. PATENT DOCUMENTS

| | | | | |
|---|---|---|---|---|
| 7,492,303 B1* | 2/2009 | Levitan | ............... | G01S 7/024 |
| | | | | 342/188 |
| 8,730,098 B1* | 5/2014 | Fox | ............... | G01S 13/04 |
| | | | | 342/91 |
| 10,310,077 B2* | 6/2019 | Hoare | ............... | G01S 13/931 |
| 2005/0099330 A1* | 5/2005 | Hausner | ............... | G01V 3/12 |
| | | | | 342/195 |
| 2005/0285773 A1* | 12/2005 | Hartzstein | ............... | H01Q 1/3233 |
| | | | | 342/107 |
| 2011/0102238 A1* | 5/2011 | Kamo | ............... | G01S 7/025 |
| | | | | 342/70 |
| 2016/0025839 A1* | 1/2016 | Trummer | ............... | G01S 13/931 |
| | | | | 342/188 |
| 2018/0024226 A1* | 1/2018 | Izadian | ............... | H01Q 5/55 |
| | | | | 342/188 |
| 2018/0052229 A1* | 2/2018 | Ranney | ............... | G01S 13/885 |
| 2018/0224536 A1* | 8/2018 | Wang | ............... | G01S 13/50 |
| 2018/0292530 A1* | 10/2018 | Kawai | ............... | G01S 7/42 |
| 2018/0335518 A1* | 11/2018 | Fox | ............... | G01S 7/025 |
| 2019/0187247 A1* | 6/2019 | Izadian | ............... | G01S 7/41 |
| 2019/0190133 A1* | 6/2019 | Izadian | ............... | H01Q 21/064 |
| 2019/0271765 A1* | 9/2019 | Ben Khadhra | ............... | G01S 7/025 |
| 2019/0331790 A1* | 10/2019 | Ben Khadhra | ............... | G01S 7/414 |
| 2020/0025868 A1* | 1/2020 | Trummer | ............... | G01S 7/026 |
| 2020/0062245 A1* | 2/2020 | Samotsvet | ............... | G06T 7/60 |

FOREIGN PATENT DOCUMENTS

| | | |
|---|---|---|
| JP | 2007-017356 | 1/2007 |
| JP | 2012-018124 | 1/2012 |

* cited by examiner

FIG. 2

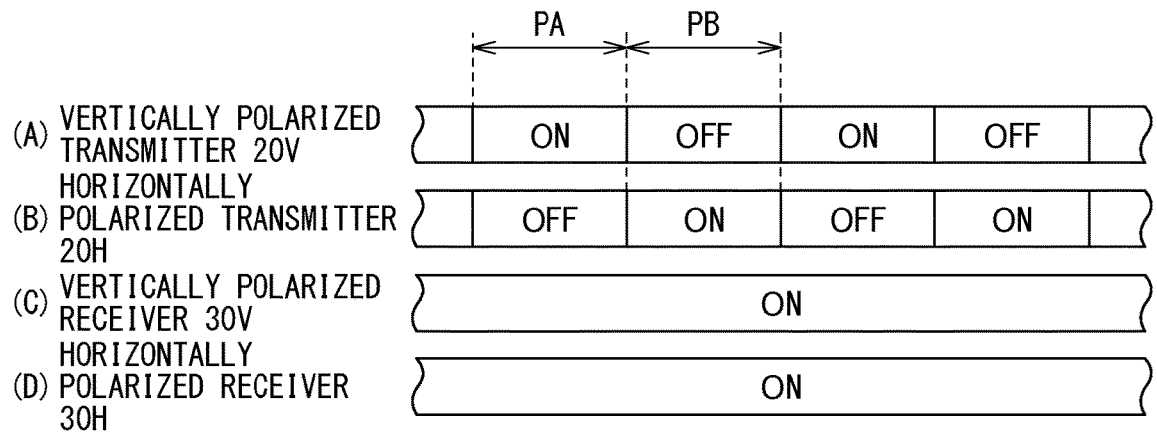

FIG. 3

|  | POLARIZATION OF INCIDENT RADIO WAVE | |
|---|---|---|
|  | VERTICAL POLARIZATION | HORIZONTAL POLARIZATION |
| REFLECTOR RA | VERTICAL POLARIZATION → HORIZONTAL POLARIZATION | HORIZONTAL POLARIZATION → HORIZONTAL POLARIZATION |
| REFLECTOR RB | VERTICAL POLARIZATION → 45-DEGREE POLARIZATION | HORIZONTAL POLARIZATION → HORIZONTAL POLARIZATION |
| REFLECTOR RC | VERTICAL POLARIZATION → VERTICAL POLARIZATION | HORIZONTAL POLARIZATION → VERTICAL POLARIZATION |
| REFLECTOR RD | VERTICAL POLARIZATION → VERTICAL POLARIZATION | HORIZONTAL POLARIZATION → 45-DEGREE POLARIZATION |
| REFLECTOR RE | VERTICAL POLARIZATION → HORIZONTAL POLARIZATION | HORIZONTAL POLARIZATION → VERTICAL POLARIZATION |

FIG. 15

|  | POLARIZATION OF INCIDENT RADIO WAVE ||
|  | VERTICAL POLARIZATION | HORIZONTAL POLARIZATION |
| --- | --- | --- |
| REFLECTOR RF | VERTICAL POLARIZATION → RIGHT-HAND CIRCULAR POLARIZATION | HORIZONTAL POLARIZATION → LEFT-HAND CIRCULAR POLARIZATION |
| REFLECTOR RG | VERTICAL POLARIZATION → LEFT-HAND CIRCULAR POLARIZATION | HORIZONTAL POLARIZATION → RIGHT-HAND CIRCULAR POLARIZATION |
| REFLECTOR RH | VERTICAL POLARIZATION → RIGHT-HAND CIRCULAR POLARIZATION | HORIZONTAL POLARIZATION → HORIZONTAL POLARIZATION |
| REFLECTOR RI | VERTICAL POLARIZATION → LEFT-HAND CIRCULAR POLARIZATION | HORIZONTAL POLARIZATION → HORIZONTAL POLARIZATION |
| REFLECTOR RJ | VERTICAL POLARIZATION → VERTICAL POLARIZATION | HORIZONTAL POLARIZATION → RIGHT-HAND CIRCULAR POLARIZATION |
| REFLECTOR RK | VERTICAL POLARIZATION → VERTICAL POLARIZATION | HORIZONTAL POLARIZATION → LEFT-HAND CIRCULAR POLARIZATION |

|  | POLARIZATION OF INCIDENT RADIO WAVE |
|---|---|
|  | VERTICAL POLARIZATION |
| REFLECTOR RA2 | VERTICAL POLARIZATION → HORIZONTAL POLARIZATION |
| REFLECTOR RB2 | VERTICAL POLARIZATION → 45-DEGREE POLARIZATION |

RADAR APPARATUS, RADAR CONTROL APPARATUS, AND RADAR SYSTEM

CROSS REFERENCE TO RELATED APPLICATIONS

This application is a national stage application under 35 U.S.C. 371 and claims the benefit of PCT Application No. PCT/JP2019/010852 having an international filing date of 15 Mar. 2019, which designated the United States, which PCT application claimed the benefit of Japanese Patent Application No. 2018-075865 filed 11 Apr. 2018, the entire disclosures of each of which are incorporated herein by reference.

TECHNICAL FIELD

The present disclosure relates to a radar apparatus that transmits radio waves and detects radio waves reflected by a detection target, a radar control apparatus to be used in such a radar apparatus, and a radar system including such a radar apparatus.

BACKGROUND ART

In a radar system, a radio wave transmitted from a transmitter is reflected by a detection target and the reflected radio wave is received by a receiver. For example, PTL 1 discloses a radar apparatus that transmits a radio wave with horizontal polarization (horizontal polarization) and receives a radio wave with vertical polarization (vertical polarization).

CITATION LIST

Patent Literature

PTL 1: Japanese Unexamined Patent Application Publication No 2006-133108

SUMMARY OF THE INVENTION

It is desired in a radar system to detect various detection targets with high accuracy, and further improvement in accuracy is expected.

It is desirable to provide a radar apparatus, a radar control apparatus, and a radar system that make it possible to detect various detection targets with high accuracy.

A first radar apparatus according to one embodiment of the present disclosure includes a transmission unit, a reception unit, and a control unit. The transmission unit is configured to transmit radio waves. The reception unit includes a first receiver configured to receive a first reflected radio wave and a second receiver configured to receive a second reflected radio wave. The first reflected radio wave and the second reflected radio wave have different polarization characteristics from each other and are included in reflected radio waves that are the radio waves reflected by a detection target. The control unit is configured to control operations of the transmission unit and the reception unit, and configured to identify the detection target on the basis of the operation of the transmission unit, a first reception level at the first receiver, and a second reception level at the second receiver.

A second radar apparatus according to one embodiment of the present disclosure includes a transmission unit, a reception unit, and a control unit. The transmission unit includes a first transmitter configured to transmit a first radio wave and a second transmitter configured to transmit a second radio wave. The first radio wave and the second radio wave have different polarization characteristics from each other. The reception unit is configured to receive reflected radio waves that are radio waves reflected by a detection target. The radio waves include the first radio wave and the second radio wave. The control unit is configured to control operations of the transmission unit and the reception unit, and configured to identify the detection target on the basis of information as to which of the first transmitter and the second transmitter is operating, and a reception level at the reception unit.

A radar control apparatus according to one embodiment of the present disclosure is configured to perform: a first control operation of controlling an operation of a transmission unit configured to transmit radio waves a second control operation of controlling an operation of a reception unit including a first receiver configured to receive a first reflected radio wave and a second receiver configured to receive a second reflected radio wave, the first reflected radio wave and the second reflected radio wave having different polarization characteristics from each other and being included in reflected radio waves that are the radio waves reflected by a detection target; and an identification operation of identifying the detection target on the basis of the operation of the transmission unit, a first reception level at the first receiver, and a second reception level at the second receiver.

A radar system according to one embodiment of the present disclosure includes a radar apparatus, and a reflector provided for a detection target of the radar apparatus. The radar apparatus includes a transmission unit, a reception unit, and a control unit. The transmission unit is configured to transmit radio waves. The reception unit includes a first receiver configured to receive a first reflected radio wave and a second receiver configured to receive a second reflected radio wave. The first reflected radio wave and the second reflected radio wave have different polarization characteristics from each other and are included in reflected radio waves that are the radio waves reflected by the reflector. The control unit is configured to control operations of the transmission unit and the reception unit, and configured to identify the detection target on the basis of the operation of the transmission unit, a first reception level at the first receiver, and a second reception level at the second receiver.

In the first radar apparatus, the radar control apparatus, and the radar system according to one embodiment of the present disclosure, the transmission unit transmits the radio waves. Then, the radio waves are reflected by a reflector. The first receiver receives the first reflected radio wave included in the reflected radio waves, and the second receiver receives the second reflected radio wave included in the reflected radio waves. The first reflected radio wave and the second reflected radio wave have different polarization characteristics from each other. Then, the detection target is identified on the basis of the operation of the transmission unit, the first reception level at the first receiver, and the second reception level at the second receiver.

In the second radar apparatus according to one embodiment of the present disclosure, the first transmitter transmits the first radio wave and the second transmitter transmits the second radio wave. The first radio wave and the second radio wave have different polarization characteristics from each other. The first radio wave and the second radio wave have different polarization characteristics from each other. Then, the radio waves including the first radio wave and the second radio wave are reflected by the detection target. The reception unit receives the reflected radio waves. Then, the detection target is identified on the basis of the information as to which of the first transmitter and the second transmitter is operating, and the reception level at the reception unit.

In the first radar apparatus, the radar control apparatus, and the radar system according to one embodiment of the present disclosure, the first receiver configured to receive the first reflected radio wave and the second receiver configured to receive the second reflected radio wave are provided. The detection target is identified on the basis of the operation of the transmission unit, the first reception level at the first receiver, and the second reception level at the second receiver. This makes it possible to detect various detection targets with high accuracy.

In the second radar apparatus according to one embodiment of the present disclosure, the first transmitter configured to transmit the first radio wave and the second transmitter configured to transmit the second radio wave are provided. The detection target is identified on the basis of the information as to which of the first transmitter and the second transmitter is operating, and the reception level at the reception unit. This makes it possible to detect various detection targets with high accuracy.

It is to be noted that the effects described here are not necessarily limitative, and may include any of the effects described in the present disclosure.

BRIEF DESCRIPTION OF DRAWINGS

FIG. 2 is a timing diagram illustrating operation of a transmission unit and a reception unit illustrated in FIG. 1.

FIG. 3 is a table illustrating examples of characteristics of various reflectors.

FIG. 15 is a table illustrating examples of characteristics of various reflectors according to the modification example.

MODES FOR CARRYING OUT THE INVENTION

In the following, some embodiments of the present disclosure are described in detail with reference to the drawings. It is to be noted that description is given in the following order.
1. First Embodiment
2. Second Embodiment
3. Third Embodiment 1. First Embodiment

[Configuration Example]

Figure 1:
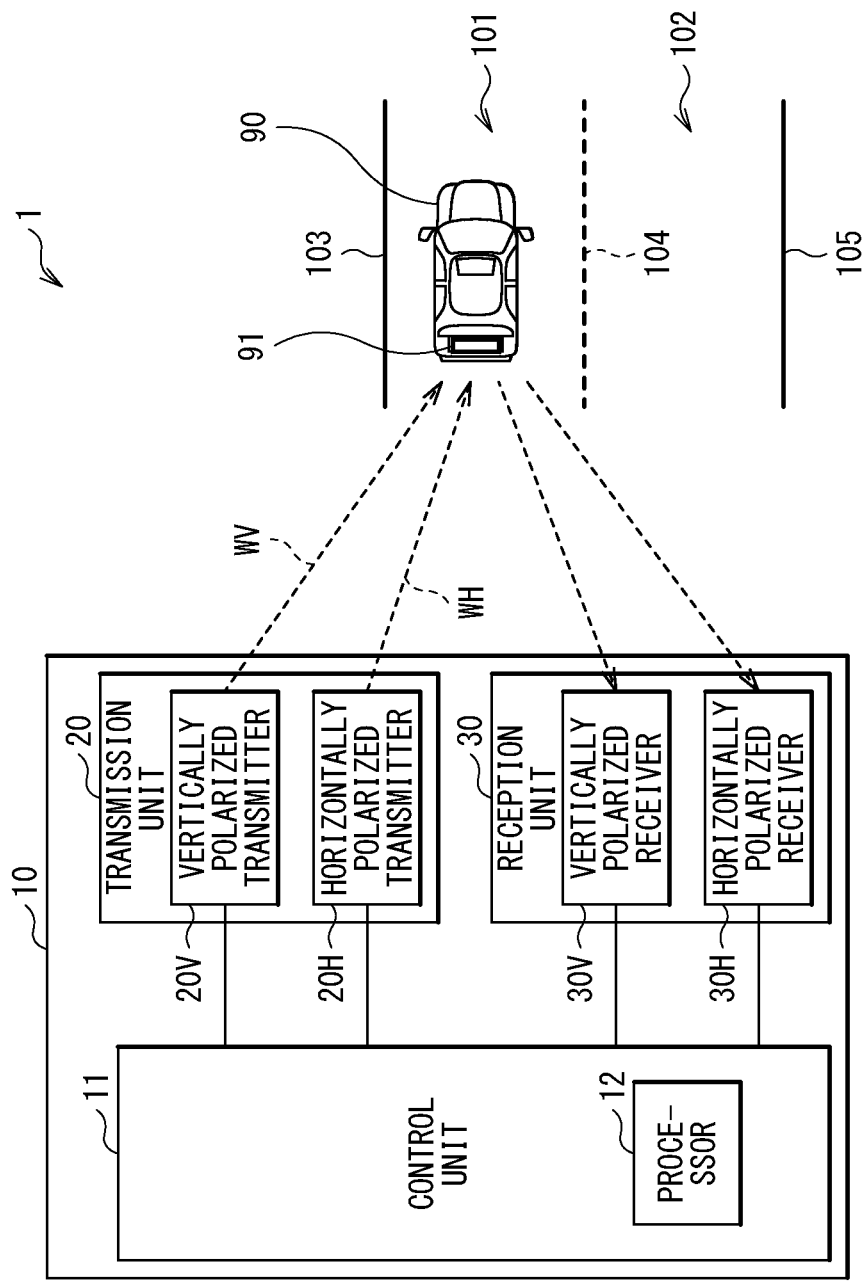
FIG. 1 is a configuration diagram illustrating a configuration example of a radar system according to a first embodiment of the present disclosure.

FIG. 1 illustrates a configuration example of a radar system (radar system 1) according to a first embodiment. The radar system 1 detects, for example, a vehicle (detection target) such as an automobile. The radar system 1 includes a radar apparatus 10 and a vehicle 90.

The radar apparatus 10 uses radio waves to detect the detection target. In this example, the radar apparatus 10 is mounted on a vehicle and is configured to detect a position (distance and direction) of another vehicle (in this example, the vehicle 90) as seen from its own vehicle (own vehicle). The radar apparatus 10 includes a transmission unit 20, a reception unit 30, and a control unit 11.

The transmission unit 20 transmits radio waves on the basis of an instruction from the control unit 11, The transmission unit 20 includes a vertically polarized transmitter 20V and a horizontally polarized transmitter 20H. The vertically polarized transmitter 20V transmits a radio wave WV with vertical polarization. The horizontally polarized transmitter 20H transmits a radio wave WH with horizontal polarization. The vertically polarized transmitter 20V and the horizontally polarized transmitter 20H are configured to alternately transmit the radio wave WV and the radio wave WH on the basis of the instruction from the control unit 11 by, for example, operating alternately in time division.

The reception unit 30 receives, on the basis of an instruction from the control unit 11, radio waves transmitted from the transmission unit 20 and reflected by the vehicle 90. The reception unit 30 includes a vertically polarized receiver 30V and a horizontally polarized receiver 30H. The vertically polarized receiver 30V receives a radio wave with vertical polarization. The horizontally polarized receiver 30H receives a radio wave with horizontal polarization. The vertically polarized receiver 30V and the horizontally polarized receiver 30H are configured to continuously operate at all times on the basis of the instruction from the control unit 11.

FIG. 2 illustrates an operation example of the transmission unit 20 and the reception unit 30, where (A) illustrates the operation of the vertically polarized transmitter 20V, (B) illustrates the operation of the horizontally polarized transmitter 20H, (C) illustrates the operation of the vertically polarized receiver 30V, and (D) illustrates the operation of the horizontally polarized receiver 30H. In (A) and (B) of FIG. 2, "ON" indicates that radio waves are transmitted, and "OFF" indicates that transmission of radio waves is stopped. In (C) and (D) of FIG. 2, "ON" indicates a state of being ready to receive radio waves.

As illustrated in (A) and (B) of FIG. 2, in a period P1, the vertically polarized transmitter 20V transmits the radio wave WV, and the horizontally polarized transmitter 20H does not transmit the radio wave WH. Further, in a period P2, the horizontally polarized transmitter 20H transmits the radio wave WH, and the vertically polarized transmitter 20V does not transmit the radio wave WV Thus, the vertically polarized transmitter 20V and the horizontally polarized transmitter 20H transmit radio waves by operating alternately in time division. Meanwhile, as illustrated in (C) and (D) of FIG. 2, the vertically polarized receiver 30V and the horizontally polarized receiver 30H are configured to continuously operate at all times.

The control unit 11 (FIG. 1) controls operation of the transmission unit 20 and the reception unit 30. Specifically, the control unit 11 performs control to cause the vertically polarized transmitter 20V and the horizontally polarized transmitter 20H to operate alternately in time division, and performs control to cause the vertically polarized receiver 30V and the horizontally polarized receiver 30H to continuously operate at all times.

The control unit 11 includes a processor 12. The processor 12 detects the position of the vehicle 90, which is the detection target, on the basis of a result of the reception by the reception unit 30. Further, the processor 12 also has a function of identifying, for example, the vehicle 90 on the basis of information as to which of the vertically polarized transmitter 20V and the horizontally polarized transmitter 20H in the transmission unit 20 is operating, and respective reception levels at the vertically polarized receiver 30V and the horizontally polarized receiver 30H.

The vehicle 90 is the detection target of the radar apparatus 10. In this example, the own Vehicle equipped with the radar apparatus 10 is running on a lane 101, and the vehicle 90 is running in front of the own vehicle on this lane 101. Next to the lane 101 is provided a lane 102, which is an oncoming lane. A lane marking 104 is provided between the lane 101 and the lane 102. A guard rail 103 is disposed on one side of the lane 101, and a guard rail 105 is disposed on one side of the lane 102.

The vehicle 90 is installed with a reflector 91. The reflector 91 reflects radio waves transmitted from the transmission unit 20 of the radar apparatus 10. As the reflector 91, it is possible to use one of a plurality of types of reflectors (five types of reflectors RA to RE in this example).

FIG. 3 illustrates examples of the five types of reflectors RA to RE.

The reflector RA emits a radio wave with horizontal polarization toward the radar apparatus 10 in a case where the radio wave WV transmitted from the vertically polarized transmitter 20V enters (vertical polarization→horizontal polarization), and emits a radio wave with horizontal polarization toward the radar apparatus 10 in a case where the radio wave WH transmitted from the horizontally polarized transmitter 20H enters (horizontal polarization→horizontal polarization).

Figure 4:
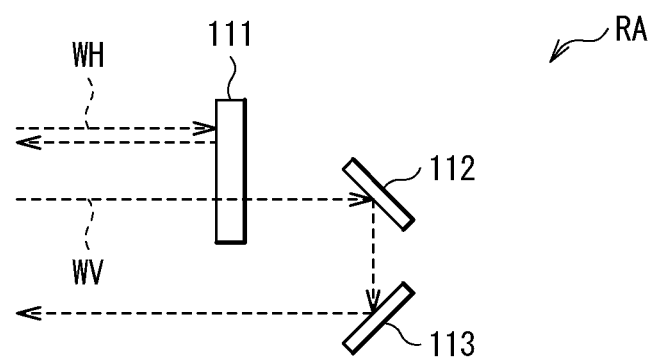
FIG. 4 is a configuration diagram according to a configuration example of a reflector.

FIG. 4 illustrates a configuration example of the reflector RA. In this example, the reflector RA includes a liquid crystal device 111 and reflective members 112 and 113. The liquid crystal device 111 changes an orientation of a polarization plane of a radio wave, as with a liquid crystal display. Specifically, in a case where the radio wave WH transmitted from the horizontally polarized transmitter 20H enters, the liquid crystal device 111 reflects the radio wave WH toward the radar apparatus 10 while maintaining the orientation of the polarization plane. Further, in a case where the radio wave WV transmitted from the vertically polarized transmitter 20V enters, the liquid crystal device 111 rotates the orientation of the polarization plane of the radio wave WV by 90 degrees while transmitting the radio wave, thereby emitting a radio wave with horizontal polarization. A rotational angle of the polarization plane in the liquid crystal device 111 is adjustable by, for example, changing a voltage applied to the liquid crystal device 111. The reflective member 112 reflects the radio wave emitted from the liquid crystal device 111 toward the reflective member 113 while maintaining the orientation of the polarization plane. The reflective member 113 reflects the radio wave reflected at the reflective member 112 toward the radar apparatus 10 while maintaining the orientation of the polarization plane.

Figure 5:
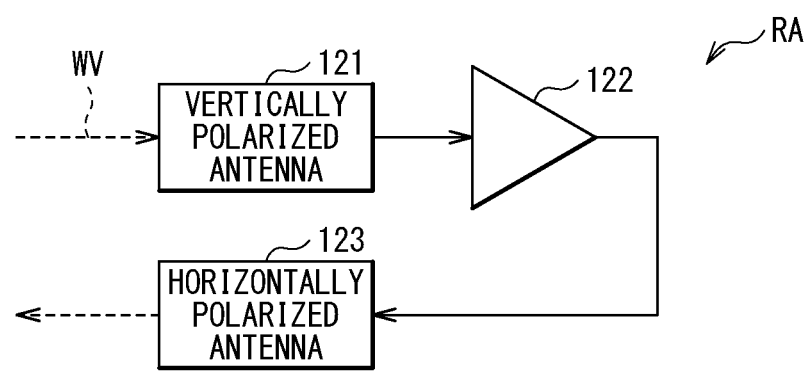
FIG. 5 is a configuration diagram according to another configuration example of the reflector.

FIG. 5 illustrates another configuration example of the reflector RA. In this example, the reflector RA includes a vertically polarized antenna 121, an amplifier 122, and a horizontally polarized antenna 123. The vertically polarized antenna 121 receives the radio wave WV transmitted from the vertically polarized transmitter 20V and generates an electric signal corresponding to the radio wave WV The amplifier 122 amplifies the electric signal supplied from the vertically polarized antenna 121. On the basis of the electric signal amplified in the amplifier 122, the horizontally polarized antenna 123 emits a radio wave with horizontal polarization toward the radar apparatus 10. Further, this reflector RA is configured to reflect the radio wave WH transmitted from the horizontally polarized transmitter 20H toward the radar apparatus 10 while maintaining the orientation of the polarization plane.

Figure 6:
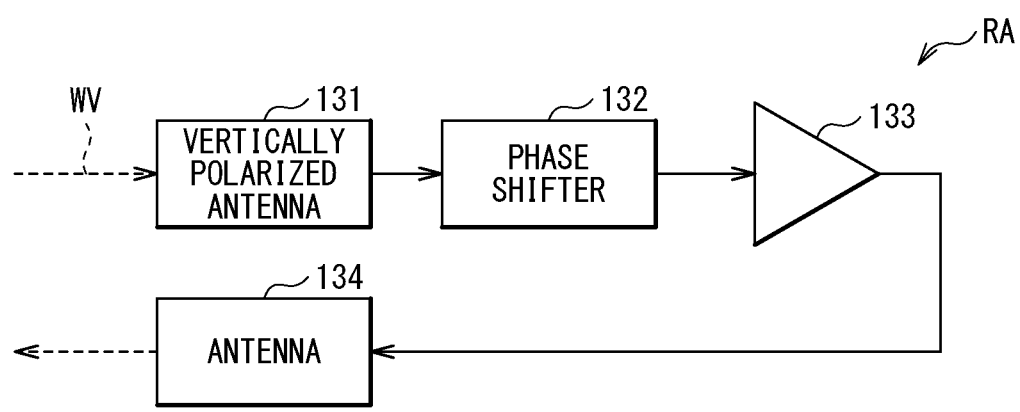
FIG. 6 is a configuration diagram according to another configuration example of the reflector.

FIG. 6 illustrates another configuration example of the reflector RA. In this example, the reflector RA includes a vertically polarized antenna 131, a phase shifter 132, an amplifier 133, and an antenna 134. The vertically polarized antenna 131 receives the radio wave WV transmitted from the vertically polarized transmitter 20V and generates an electric signal corresponding to the radio wave WV The phase shifter 132 shifts a phase of the electric signal supplied from the vertically polarized antenna 131. The amplifier 133 amplifies the electric signal whose phase has been shifted by the phase shifter 132. On the basis of the electric signal amplified in the amplifier 122, the antenna 134 emits a radio wave toward the radar apparatus 10. Adjusting a phase quantity in the phase shifter 132 enables the antenna 134 to emit a radio wave with horizontal polarization. Further, this reflector RA is configured to reflect the radio wave WH transmitted from the horizontally polarized transmitter 20H toward the radar apparatus 10 while maintaining the orientation of the polarization plane.

As illustrated in FIG. 3, the reflector RB emits, toward the radar apparatus 10, a radio wave whose polarization plane is rotated by 45 degrees in a case where the radio wave WV transmitted from the vertically polarized transmitter 20V enters (vertical polarization→45-degree polarization), and emits a radio wave with horizontal polarization toward the radar apparatus 10 in a case where the radio wave WH transmitted from the horizontally polarized transmitter 20H enters (horizontal polarization→horizontal polarization). The reflector RB is implementable by, for example, adjusting the voltage applied to the liquid crystal device 111 in the configuration illustrated in FIG. 4. Further, the reflector RB is implementable by, for example, adjusting the phase quantity in the phase shifter 132 in the configuration illustrated in FIG. 6.

As illustrated in FIG. 3, the reflector RC emits a radio wave with vertical polarization toward the radar apparatus 10 in a case where the radio wave WV transmitted from the vertically polarized transmitter 20V enters (vertical polarization→vertical polarization), and emits a radio wave with vertical polarization toward the radar apparatus 10 in a case where the radio wave WH transmitted from the horizontally polarized transmitter 20H enters (horizontal polarization→vertical polarization). The reflector RC is implementable by using a configuration similar to that of the reflector RA.

As illustrated in FIG. 3, the reflector RD emits a radio wave with vertical polarization toward the radar apparatus 10 in a case where the radio wave WV transmitted from the vertically polarized transmitter 20V enters (vertical polarization→vertical polarization), and emits a radio wave whose polarization plane is rotated by 45 degrees toward the radar apparatus 10 in a case where the radio wave WH transmitted from the horizontally polarized transmitter 20H enters (horizontal polarization→45-degree polarization). The reflector RD is implementable by using a configuration similar to that of the reflector RB.

As illustrated in FIG. 3, the reflector RE emits a radio wave with horizontal polarization toward the radar apparatus 10 in a case where the radio wave WV transmitted from the vertically polarized transmitter 20V enters (vertical polarization→horizontal polarization), and emits a radio wave with vertical polarization toward the radar apparatus 10 in a case where the radio wave WH transmitted from the horizontally polarized transmitter 20H enters (horizontal polarization→vertical polarization).

Figure 7:
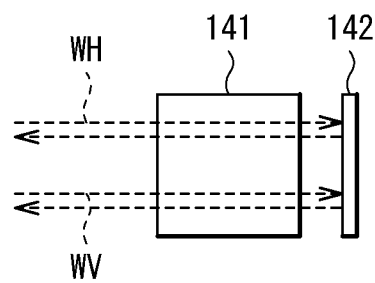
FIG. 7 is a configuration diagram according to a configuration example of another reflector.

FIG. 7 illustrates a configuration example of the reflector RE. In this example, the reflector RE includes a Faraday rotator 141 and a reflective member 142. The Faraday rotator 141 rotates the orientation of the polarization plane of a radio wave to be transmitted by a predetermined angle (45 degrees in this example). The reflective member 142 reflects the radio wave emitted from the Faraday rotator 141 toward the Faraday rotator 141 while maintaining the orientation of the polarization plane. Further, in a case where the radio wave WV transmitted from the vertically polarized transmitter 20V enters, the Faraday rotator 141 rotates the orientation of the polarization plane of the radio wave by 45 degrees while transmitting the radio wave, thereby emitting a radio wave with 45-degree polarization toward the reflective member 142, and further rotates the orientation of the polarization plane of the radio wave reflected by the reflective member 142 by 45 degrees while transmitting the radio wave, thereby emitting a radio wave with horizontal polarization toward the radar apparatus 10. In a case where the radio wave WH transmitted from the horizontally polarized transmitter 20H enters, the Faraday rotator 141 rotates the orientation of the polarization plane of the radio wave by 45 degrees while transmitting the radio wave, thereby emitting a radio wave with 45-degree polarization toward the reflective member 142, and further rotates the orientation of the polarization plane of the radio wave reflected by the reflective member 142 by 45 degrees while transmitting the radio wave, thereby emitting a radio wave with vertical polarization toward the radar apparatus 10. A rotational angle of the polarization plane in the Faraday rotator 141 is adjustable by, for example, changing a magnetic field applied to the Faraday rotator 141.

It is to be noted that a body of a vehicle not installed with the reflector 91 reflects a radio wave transmitted from the transmission unit 20 while maintaining the orientation of the polarization plane. Therefore, for example, this body emits a radio wave with vertical polarization in a case where the radio wave WV transmitted from the vertically polarized transmitter 20V enters (vertical polarization→vertical polarization), and emits a radio wave with horizontal polarization in a case where the radio wave WH transmitted from the horizontally polarized transmitter 20H enters (horizontal polarization→horizontal polarization).

As the reflector 91, for example, it is possible to use one of such a plurality of types of reflectors (in this example, the five types of reflectors RA to RE). It is to be noted that these reflectors may also be installed in the guard rails 103 and 105, for example. This makes it possible, in the radar system 1, to identify the vehicle 90 and the guard rails 103 and 105 depending on the reflector 91.

Here, the transmission unit 20 corresponds to a specific example of a "transmission unit" in the present disclosure. The reception unit 30 corresponds to a specific example of a "reception unit" in the present disclosure. The control unit 11 corresponds to a specific example of a "control unit" in the present disclosure. The vehicle 90 corresponds to a specific example of a "detection target" in the present disclosure.

[Operation and Workings]

Next, operation and workings of the radar system 1 of the present embodiment will be described.

(Outline of Overall Operation)

First, an outline of overall operation of the radar system 1 will be described with reference to FIG. 1. The transmission unit 20 transmits radio waves on the basis of an instruction from the control unit 11, Specifically, the vertically polarized transmitter 20V transmits the radio wave WV with vertical polarization, and the horizontally polarized transmitter 20H transmits the radio wave WH with horizontal polarization. The radio waves transmitted from the transmission unit 20 are reflected by the reflector 91 of the vehicle 90, for example. The reception unit 30 receives the radio waves reflected by the reflector 91 of the vehicle 90 on the basis of an instruction from the control unit 11. Specifically, the vertically polarized receiver 30V receives a radio wave with vertical polarization, and the horizontally polarized receiver 30H receives a radio wave with horizontal polarization. The processor 12 detects the position of the vehicle 90, which is the detection target, on the basis of the result of the reception by the reception unit 30. Further, the processor 12 identifies the vehicle 90 on the basis of the information as to which of the vertically polarized transmitter 20V and the horizontally polarized transmitter 20H in the transmission unit 20 is operating and the respective reception levels at the vertically polarized receiver 30V and the horizontally polarized receiver 30H.

(Detailed Operation)

Next, detailed description will be given on operations of identifying the detection target in the radar system 1 in a case where any of the five types of reflectors RA to RE is installed in the vehicle 90 and in a case where no reflector is installed in a vehicle.

Figure 8:
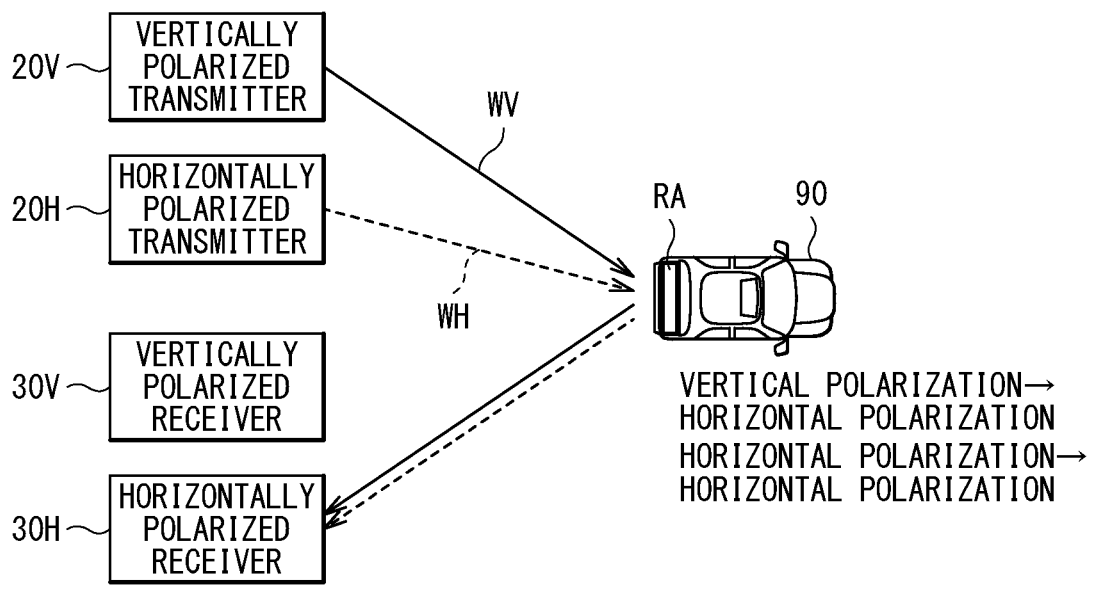
FIG. 8 is an explanatory diagram illustrating an operation example of the radar system illustrated in FIG. 1.

FIG. 8 illustrates an operation example of the radar system 1 in a case where the reflector RA is used as the reflector 91. In FIG. 8, solid lines indicate available radio waves in a case where the vertically polarized transmitter 20V is transmitting the radio wave WV, and broken lines indicate available radio waves in a case where the horizontally polarized transmitter 20H is transmitting the radio wave WH.

If the vertically polarized transmitter 20V transmits the radio wave WV with vertical polarization and this radio wave WV enters the reflector RA, the reflector RA emits a radio wave with horizontal polarization toward the radar apparatus 10 (vertical polarization→horizontal polarization). Thus, the vertically polarized receiver 30V hardly receives the radio wave reflected by the reflector RA, and the horizontally polarized receiver 30H receives the radio wave reflected by the reflector RA.

Further, if the horizontally polarized transmitter 20H transmits the radio wave WH with horizontal polarization and this radio wave WH enters the reflector RA, the reflector RA emits a radio wave with horizontal polarization toward the radar apparatus 10 (horizontal polarization→horizontal polarization). Thus, the vertically polarized receiver 30V hardly receives the radio wave reflected by the reflector RA, and the horizontally polarized receiver 30H receives the radio wave reflected by the reflector RA.

Figure 9:
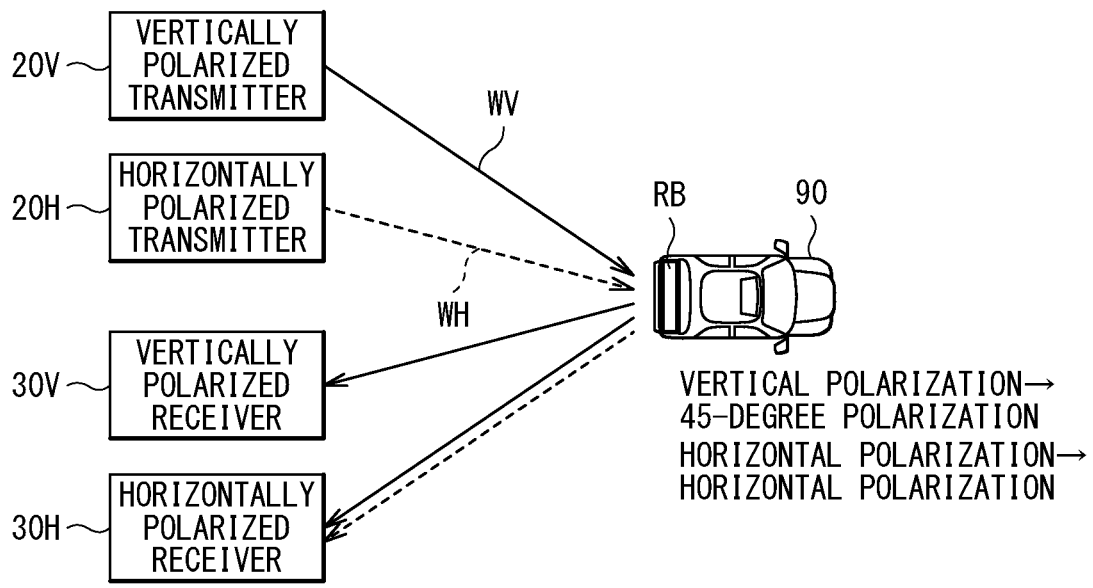
FIG. 9 is an explanatory diagram illustrating another operation example of the radar system illustrated in FIG. 1.

FIG. 9 illustrates an operation example of the radar system 1 in a case where the reflector RB is used as the reflector 91.

If the vertically polarized transmitter 20V transmits the radio wave WV with vertical polarization and this radio wave WV enters the reflector RB, the reflector RB emits a radio wave with 45-degree polarization toward the radar apparatus 10 (vertical polarization→45-degree polarization). Thus, the vertically polarized receiver 30V and the horizontally polarized receiver 30H receive the radio wave reflected by the reflector RB. The reception level at the vertically polarized receiver 30V is lower than that in a case where the vertically polarized receiver 30V receives a radio wave with vertical polarization, because the radio wave received by the vertically polarized receiver 30V is a radio wave 45-degree polarization. Similarly, the reception level at the horizontally polarized receiver 30H is lower than that in a case where the horizontally polarized receiver 30H receives a radio wave with horizontal polarization, because the radio wave received by the horizontally polarized receiver 30H is a radio wave with 45-degree polarization. The reception level at the vertically polarized receiver 30V and the reception level at the horizontally polarized receiver 30H are substantially equal to each other.

Further, if the horizontally polarized transmitter 20H transmits the radio wave WH with horizontal polarization and this radio wave WH enters the reflector RB, the reflector RB emits a radio wave with horizontal polarization toward the radar apparatus 10 (horizontal polarization→horizontal polarization). Thus, the vertically polarized receiver 30V hardly receives the radio wave reflected by the reflector RB, and the horizontally polarized receiver 30H receives the radio wave reflected by the reflector RB.

Figure 10:
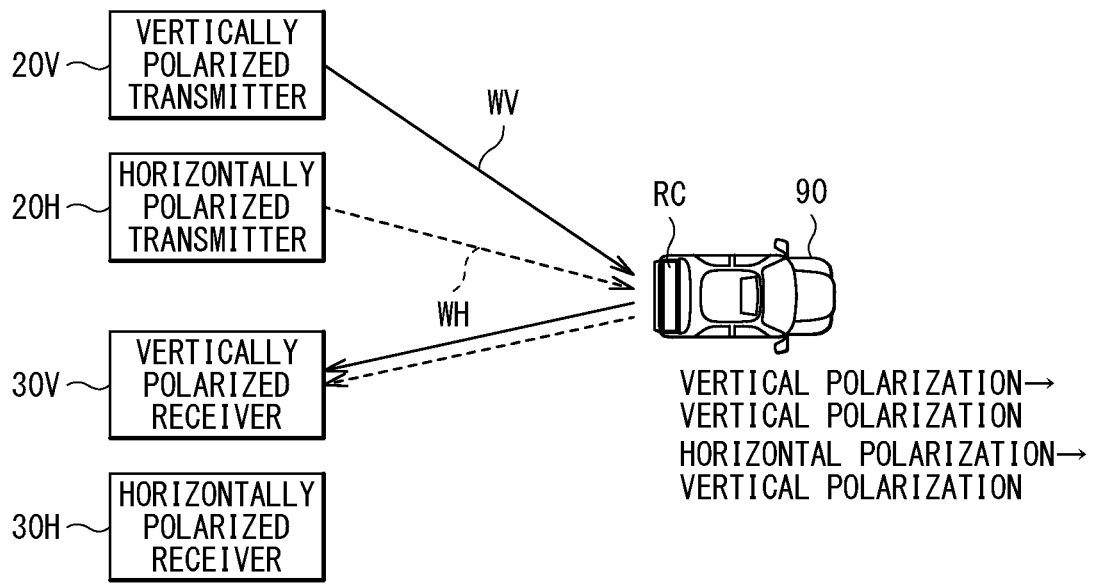
FIG. 10 is an explanatory diagram illustrating another operation example of the radar system illustrated in FIG. 1.

FIG. 10 illustrates an operation example of the radar system 1 in a case where the reflector RC is used as the reflector 91.

If the vertically polarized transmitter 20V transmits the radio wave WV with vertical polarization and this radio wave WV enters the reflector RC, the reflector RC emits a radio wave with vertical polarization toward the radar apparatus 10 (vertical polarization→vertical polarization). Thus, the vertically polarized receiver 30V receives the radio wave reflected by the reflector RC, and the horizontally polarized receiver 30H hardly receives the radio wave reflected by the reflector RC.

Further, if the horizontally polarized transmitter 20H transmits the radio wave WH with horizontal polarization and this radio wave WH enters the reflector RC, the reflector RC emits a radio wave with vertical polarization toward the radar apparatus 10 (horizontal polarization→vertical polarization). Thus, the vertically polarized receiver 30V receives the radio wave reflected by the reflector RC, and the horizontally polarized receiver 30H hardly receives the radio wave reflected by the reflector RC.

Figure 11:
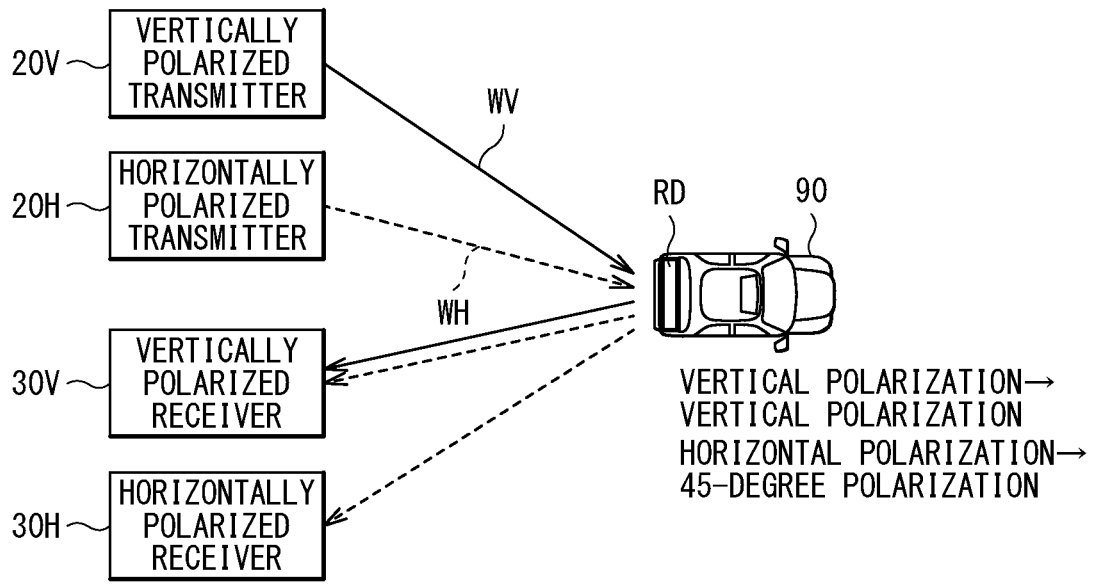
FIG. 11 is an explanatory diagram illustrating another operation example of the radar system illustrated in FIG. 1.

FIG. 11 illustrates an operation example of the radar system 1 in a case where the reflector RD is used as the reflector 91.

If the vertically polarized transmitter 20V transmits the radio wave WV with vertical polarization and this radio wave WV enters the reflector RD, the reflector RD emits a radio wave with vertical polarization toward the radar apparatus 10 (vertical polarization→vertical polarization). Thus, the vertically polarized receiver 30V receives the radio wave reflected by the reflector RD, and the horizontally polarized receiver 30H hardly receives the radio wave reflected by the reflector RD.

Further, if the horizontally polarized transmitter 20H transmits the radio wave WH with horizontal polarization and this radio wave WH enters the reflector RD, the reflector RD emits a radio wave with 45-degree polarization toward the radar apparatus 10 (horizontal polarization→45-degree polarization). Thus, the vertically polarized receiver 30V and the horizontally polarized receiver 30H receive the radio wave reflected by the reflector RD. The reception level at the vertically polarized receiver 30V is lower than that in a case where the vertically polarized receiver 30V receives a radio wave with vertical polarization, because the radio wave received by the vertically polarized receiver 30V is a radio wave with 45-degree polarization. Similarly, the reception level at the horizontally polarized receiver 30H is lower than that in a case where the horizontally polarized receiver 30H receives a radio wave with horizontal polarization, because the radio wave received by the horizontally polarized receiver 30H is a radio wave with 45-degree polarization. The reception level at the vertically polarized receiver 30V and the reception level at the horizontally polarized receiver 30H are substantially equal to each other.

Figure 12:
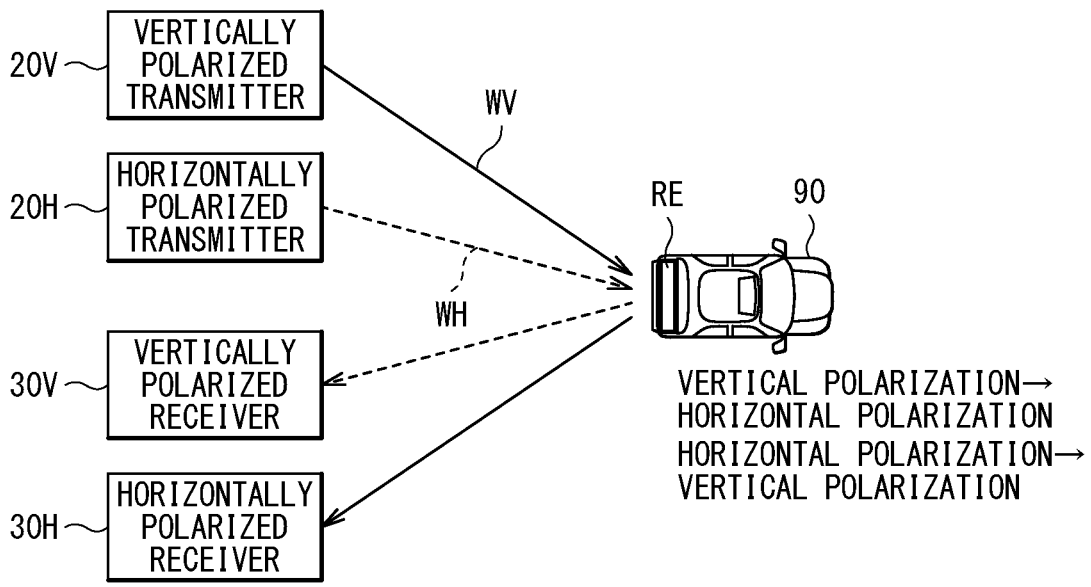
FIG. 12 is an explanatory diagram illustrating another operation example of the radar system illustrated in FIG. 1.

FIG. 12 illustrates an operation example of the radar system 1 in a case where the reflector RE is used as the reflector 91.

If the vertically polarized transmitter 20V transmits the radio wave WV with vertical polarization and this radio wave WV enters the reflector RE, the reflector RE emits a radio wave with horizontal polarization toward the radar apparatus 10 (vertical polarization→horizontal polarization). Thus, the vertically polarized receiver 30V hardly receives the radio wave reflected by the reflector RE, and the horizontally polarized receiver 30H receives the radio wave reflected by the reflector RE.

Further, if the horizontally polarized transmitter 20H transmits the radio wave WH with horizontal polarization and this radio wave WH enters the reflector RE, the reflector RE emits a radio wave with vertical polarization toward the radar apparatus 10 (horizontal polarization→vertical polarization). Thus, the vertically polarized receiver 30V receives the radio wave reflected by the reflector RE, and the horizontally polarized receiver 30H hardly receives the radio wave reflected by the reflector RE.

Figure 13:
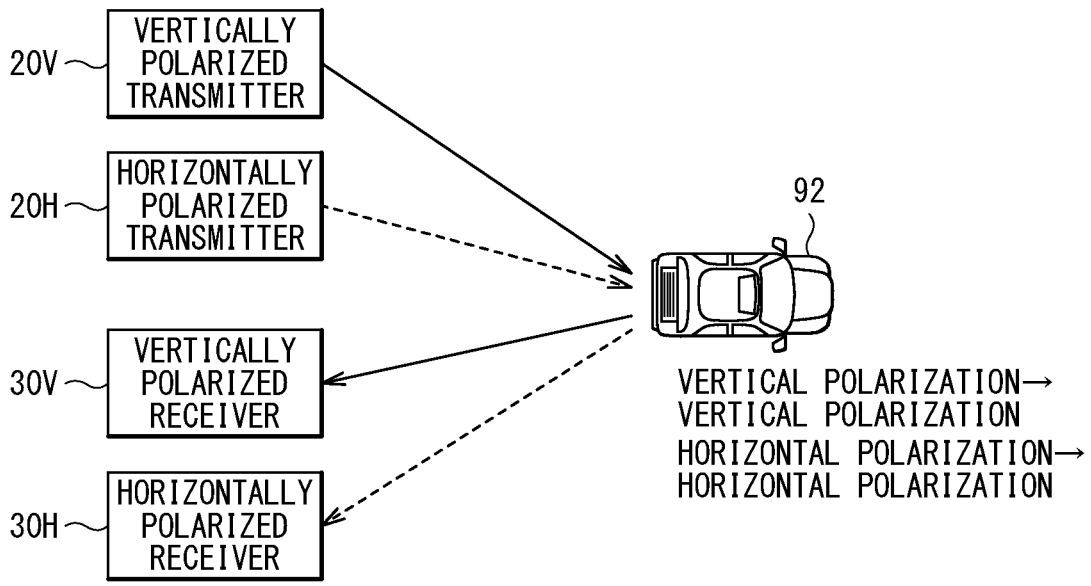
FIG. 13 is an explanatory diagram illustrating another operation example of the radar system illustrated in FIG. 1.

FIG. 13 illustrates an operation example of the radar system 1 in a case where the reflector 91 is not installed in a vehicle (vehicle 92).

If the vertically polarized transmitter 20V transmits the radio wave WV with vertical polarization and this radio wave WV enters a body of the vehicle 92, the body of the vehicle 92 emits a radio wave with vertical polarization (vertical polarization→vertical polarization). Thus, the vertically polarized receiver 30V receives the radio wave reflected by the body of the vehicle 92, and the horizontally polarized receiver 30H hardly receives the radio wave reflected by the body of the vehicle 92.

Further, if the horizontally polarized transmitter 20H transmits the radio wave WH with horizontal polarization and this radio wave WH enters the body of the vehicle 92, the body of the vehicle 92 emits a radio wave with horizontal polarization (horizontal polarization→horizontal polarization). Thus, the vertically polarized receiver 30V hardly receives the radio wave reflected by the body of the vehicle 92, and the horizontally polarized receiver 30H receives the radio wave reflected by the body of the vehicle 92.

As described above with reference to FIGS. 8 to 12, in the radar system 1, the reception levels at the vertically polarized receiver 30V and the horizontally polarized receiver 30H differ depending on whether the reflector 91 is installed in the other vehicle and which type of the reflector 91 is installed in a case where the reflector 91 is installed. This enables the radar system 1 to detect the reflector 91 on the basis of these reception levels.

As described above, in the radar system 1, the transmission unit 20 transmits the radio wave WV with vertical polarization and the radio wave WH with horizontal polarization, and the reception unit 30 receives a radio wave with vertical polarization and a radio wave with horizontal polarization. Then, the processor 12 detects the reflector 91 on the basis of the information as to which of the vertically polarized transmitter 20V and the horizontally polarized transmitter 20H in the transmission unit 20 is operating and the respective reception levels at the vertically polarized receiver 30V and the horizontally polarized receiver 30H. This makes it possible, in the radar system 1, to identify the vehicle 90 by identifying the reflector 91.

Further, in the radar system 1, the transmission unit 20 transmits the radio wave WV with vertical polarization and the radio wave WH with horizontal polarization, the reception unit 30 receives a radio wave with vertical polarization and a radio wave with horizontal polarization, and the reflector 91 that changes polarization characteristics of radio waves is used. This makes it possible to suppress influence of clutter, for example, or radio waves transmitted from an oncoming vehicle, making it possible to enhance detection accuracy. That is, for example, in a case where a transmission unit includes only the vertically polarized transmitter 20V, a reception unit includes only the vertically polarized receiver 30V, and a vehicle not installed with a reflector is to be detected, the radio wave WV transmitted from the transmission unit (the vertically polarized transmitter 20V) is reflected by a body of the vehicle, which is the detection target, and is also reflected by, for example, unevenness of a road surface, etc. Therefore, the reception unit (the vertically polarized receiver 30V) receives the radio wave reflected by the body of the vehicle, which is the detection target, and the unnecessary radio wave (clutter) reflected by the unevenness of the road surface, etc. In this case, detection accuracy can decrease, for example. In contrast, in the radar system 1, the transmission unit 20 includes the vertically polarized transmitter 20V and the horizontally polarized transmitter 20H, the reception unit 30 includes the vertically polarized receiver 30V and the horizontally polarized receiver 30H, and the reflector 91 that changes polarization characteristics of radio waves is used. Thus, for example, in a case where the transmission unit 20 transmits the radio wave WV and the reflector RA (vertical polarization→horizontal polarization) is installed as the reflector 91 in the vehicle 90, the reflector 91 emits a radio wave with horizontal polarization on the basis of the radio wave WV transmitted from the transmission unit 20. Then, the horizontally polarized receiver 30H of the reception unit 30 receives the radio wave reflected by the reflector 91, and the vertically polarized receiver 30V receives clutter. Thus, in this example, the reception level at the horizontally polarized receiver 30H is less likely to be influenced by the clutter. It is consequently possible to enhance detection accuracy in the radar system 1.

[Effects]

As described above, in the present embodiment, the transmission unit transmits a radio wave with vertical polarization and a radio wave with horizontal polarization, and the reception unit receives a radio wave with vertical polarization and a radio wave with horizontal polarization. This makes it possible to identify the detection target and enhance detection accuracy.

[Modification Example 1-1]

In the above embodiment, the five types of reflectors RA to RE are used, but this is not limitative. For example, the reflector RB rotates the polarization plane of the radio wave WV transmitted from the vertically polarized transmitter 20V by 45 degrees, but a reflector that rotates the polarization plane of the radio wave WV by 20 degrees or a reflector that rotates the polarization plane of the radio wave WV by 70 degrees may be further used. Similarly, for example, the reflector RD rotates the polarization plane of the radio wave WH transmitted from the horizontally polarized transmitter 20H by 45 degrees, but a reflector that rotates the polarization plane of the radio wave WH by 20 degrees or a reflector that rotates the polarization plane of the radio wave WH by 70 degrees may be further used. Further, for example, the reflector RE rotates the polarization plane of the radio wave WV transmitted from the vertically polarized transmitter 20V by 90 degrees and rotates the polarization plane of the radio wave WH transmitted from the horizontally polarized transmitter 20H by 90 degrees, but a reflector that rotates the polarization plane of the radio wave WV by 45 degrees and rotates the polarization plane of the radio wave WH by 45 degrees may be further used. Even in this case, for example, the processor 12 is able to identify these reflectors on the basis of the reception level at the vertically polarized receiver 30V and the reception level at the horizontally polarized receiver 30H.

[Modification Example 1-2]

In the above embodiment, the radar apparatus 10 detects the vehicle 90, which is the detection target, by using vertical polarization and horizontal polarization, but this is not limitative. Hereinafter, a radar system 1A according to the present modification example will be described in detail.

Figure 14:
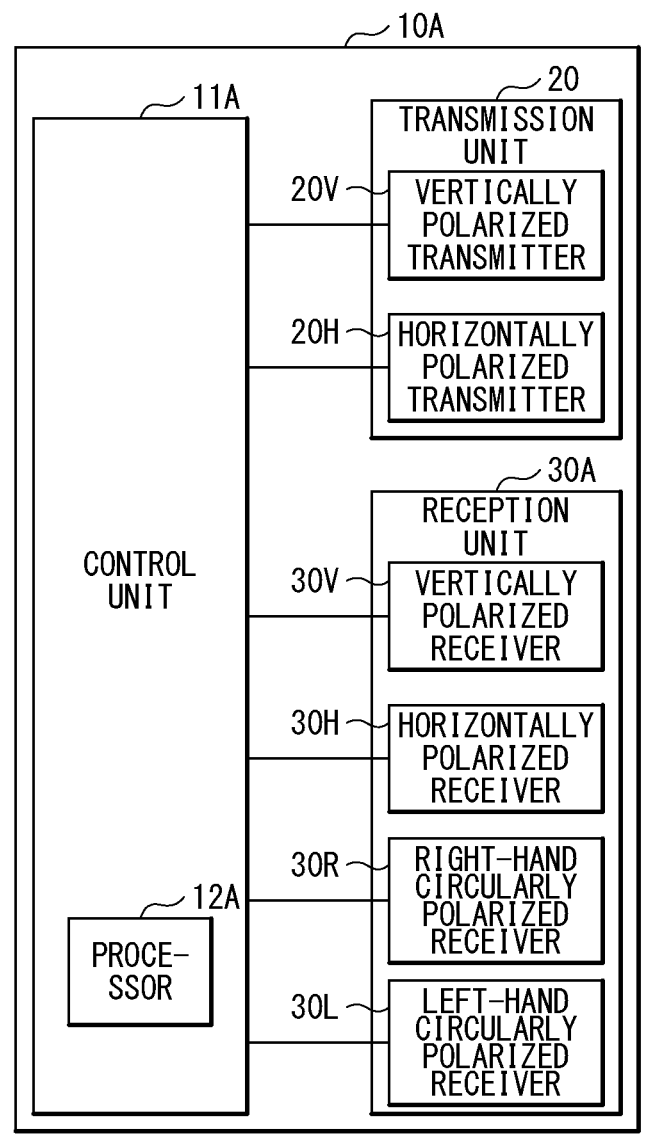
FIG. 14 is a block diagram illustrating a configuration example of a radar apparatus according to a modification example.

FIG. 14 illustrates a configuration example of a radar apparatus 10A in the radar system 1A. The radar apparatus 10A includes the transmission unit 20, a reception unit 30A, and a control unit 11A.

The reception unit 30A receives radio waves transmitted from the transmission unit 20 and reflected by the vehicle 90 on the basis of an instruction from the control unit 11A. The reception unit 30A includes the vertically polarized receiver 30V, the horizontally polarized receiver 30H, a right-hand circularly polarized receiver 30R, and a left-hand circularly polarized receiver 30L, The right-hand circularly polarized receiver 30R receives a radio wave with right-hand circular polarization. The left-hand circularly polarized receiver 30L receives a radio wave with left-hand circular polarization. The vertically polarized receiver 30V, the horizontally polarized receiver 30H, the right-hand circularly polarized receiver 30R, and the left-hand circularly polarized receiver 30L are configured to continuously operate at all times on the basis of the instruction from the control unit 11A.

The control unit 11A controls operation of the transmission unit 20 and the reception unit 30A. Specifically, the control unit 11A performs control to cause the vertically polarized transmitter 20V and the horizontally polarized transmitter 20H to operate alternately in time division, and performs control to cause the vertically polarized receiver 30V, the horizontally polarized receiver 30H, the right-hand circularly polarized receiver 30R, and the left-hand circularly polarized receiver 30L to continuously operate at all times. The control unit 11A includes a processor 12A. The processor 12A detects the position of the vehicle 90, which is the detection target, on the basis of a result of the reception by the reception unit 30A. Further, the processor 12A also has a function of identifying, for example, the vehicle 90 on the basis of information as to which of the vertically polarized transmitter 20V and the horizontally polarized transmitter 20H in the transmission unit 20 is operating and respective reception levels at the vertically polarized receiver 30V, the horizontally polarized receiver 30H, the right-hand circularly polarized receiver 30R, and the left-hand circularly polarized receiver 30L of the reception unit 30A.

As the reflector 91 installed in the vehicle 90, it is possible to use one of a plurality of types of reflectors (in this example, 11 types of reflectors RA to RK), FIG. 15 illustrates examples of the reflectors RF to RK.

The reflector RF emits a radio wave with right-hand circular polarization toward the radar apparatus 10A in a case where the radio wave WV transmitted from the vertically polarized transmitter 20V enters (vertical polarization-→right-hand circular polarization), and emits a radio wave with left-hand circular polarization toward the radar apparatus 10A in a case where the radio wave WH transmitted from the horizontally polarized transmitter 20H enters (horizontal polarization→left-hand circular polarization). It is possible to configure the reflector RF by using a quarter-wave plate, for example.

The reflector RG emits a radio wave with left-hand circular polarization toward the radar apparatus 10A in a case where the radio wave WV transmitted from the vertically polarized transmitter 20V enters (vertical polarization-→left-hand circular polarization), and emits a radio wave with right-hand circular polarization toward the radar apparatus 10A in a case where the radio wave WH transmitted from the horizontally polarized transmitter 20H enters (horizontal polarization→right-hand circular polarization).

The reflector RH emits a radio wave with right-hand circular polarization toward the radar apparatus 10A in a case where the radio wave WV transmitted from the vertically polarized transmitter 20V enters (vertical polarization-→right-hand circular polarization), and emits a radio wave with horizontal polarization toward the radar apparatus 10A in a case where the radio wave WH transmitted from the horizontally polarized transmitter 20H enters (horizontal polarization→horizontal polarization).

The reflector RI emits a radio wave with left-hand circular polarization toward the radar apparatus 10A in a case where the radio wave WV transmitted from the vertically polarized transmitter 20V enters (vertical polarization→left-hand circular polarization nd emits a radio wave with horizontal polarization toward the radar apparatus 10A in a case where the radio wave WH transmitted from the horizontally polarized transmitter 20H enters (horizontal polarization→horizontal polarization).

The reflector RJ emits a radio wave with vertical polarization toward the radar apparatus 10A in a case where the radio wave WV transmitted from the vertically polarized transmitter 20V enters (vertical polarization→vertical polarization), and emits a radio wave with right-hand circular polarization toward the radar apparatus 10A in a case where the radio wave WH transmitted from the horizontally polarized transmitter 20H enters (horizontal polarization→right-hand circular polarization).

The reflector RK emits a radio wave with vertical polarization toward the radar apparatus 10A in a case where the radio wave WV transmitted from the vertically polarized transmitter 20V enters (vertical polarization→vertical polarization), and emits a radio wave with left-hand circular polarization toward the radar apparatus 10A in a case where the radio wave WH transmitted from the horizontally polarized transmitter 20H enters (horizontal polarization→left-hand circular polarization).

Figure 16:
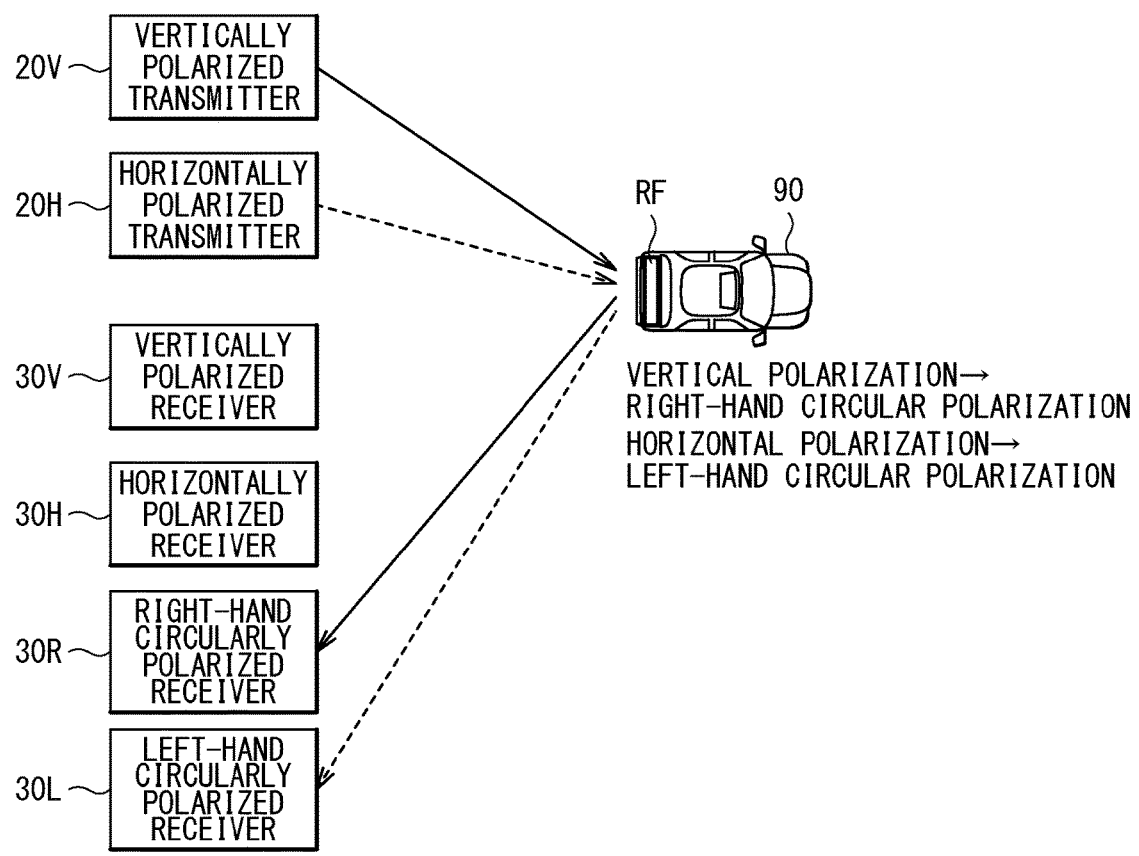
FIG. 16 is an explanatory diagram illustrating an operation example of a radar system according to the modification example.

FIG. 16 illustrates an operation example of the radar system 1A in a case where the reflector RF is used as the reflector 91.

If the vertically polarized transmitter 20V transmits the radio wave WV with vertical polarization and this radio wave WV enters the reflector RF, the reflector RF emits a radio wave with right-hand circular polarization toward the radar apparatus 10A (vertical polarization→right-hand circular polarization). Thus, the right-hand circularly polarized receiver 30R, the vertically polarized receiver 30V, and the horizontally polarized receiver 30H receive the radio wave reflected by the reflector RF, and the left-hand circularly polarized receiver 30L hardly receives the radio wave reflected by the reflector RE. The reception level at the vertically polarized receiver 30V is lower than that in a case where the vertically polarized receiver 30V receives a radio wave with vertical polarization, because the radio wave received by the vertically polarized receiver 30V is a radio wave with right-hand circular polarization. Similarly, the reception level at the horizontally polarized receiver 30H is lower than that in a case where the horizontally polarized receiver 30H receives a radio wave with horizontal polarization, because the radio wave received by the horizontally polarized receiver 30H is a radio wave right-hand circular polarization.

Further, if the horizontally polarized transmitter 20H transmits the radio wave WH with horizontal polarization and this radio wave WH enters the reflector RF, the reflector RF emits a radio wave with left-hand circular polarization toward the radar apparatus 10A (horizontal polarization-→left-hand circular polarization). Thus, the left-hand circularly polarized receiver 30L, the vertically polarized receiver 30V, and the horizontally polarized receiver 30H receive the radio wave reflected by the reflector RF, and the right-hand circularly polarized receiver 30R hardly receives the radio wave reflected by the reflector RF. The reception level at the vertically polarized receiver 30V is lower than that in a case where the vertically polarized receiver 30V receives a radio wave with vertical polarization, because the radio wave received by the vertically polarized receiver 30V is a radio wave with left-hand circular polarization. Similarly, the reception level at the horizontally polarized receiver 30H is lower than that in a case where the horizontally polarized receiver 30H receives a radio wave with horizontal polarization, because the radio wave received by the horizontally polarized receiver 30H is a radio wave with left-hand circular polarization.

Figure 17:
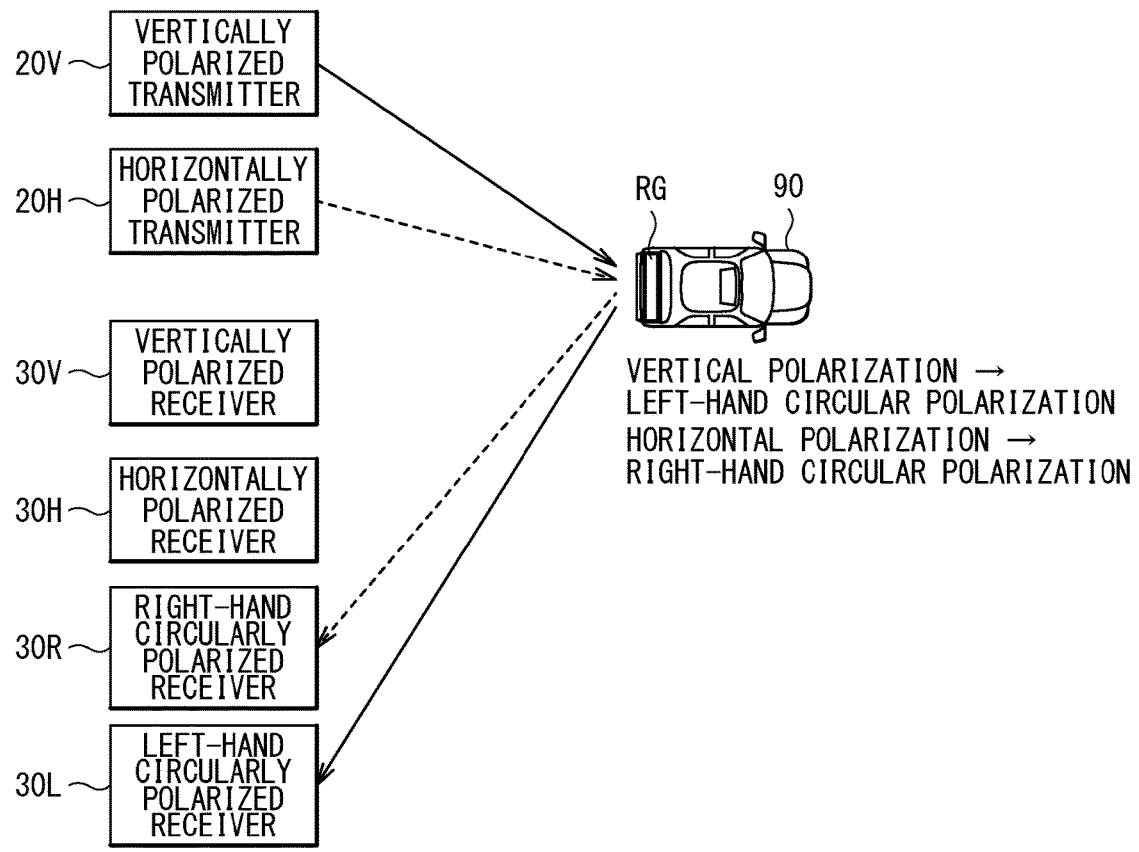
FIG. 17 is an explanatory diagram illustrating another operation example of the radar system according to the modification example.

FIG. 17 illustrates an operation example of the radar system 1A in a case where the reflector RG is used as the reflector 91.

If the vertically polarized transmitter 20V transmits the radio wave WV with vertical polarization and this radio wave WV enters the reflector RG, the reflector RG emits a radio wave with left-hand circular polarization toward the radar apparatus 10A (vertical polarization→left-hand circular polarization). Thus, the left-hand circularly polarized receiver 30L, the vertically polarized receiver 30V, and the horizontally polarized receiver 30H receive the radio wave reflected by the reflector RG, and the right-hand circularly polarized receiver 30R hardly receives the radio wave reflected by the reflector RG. The reception level at the vertically polarized receiver 30V is lower than that in a case where the vertically polarized receiver 30V receives a radio wave with vertical polarization, because the radio wave received by the vertically polarized receiver 30V is a radio wave with left-hand circular polarization. Similarly, the reception level at the horizontally polarized receiver 30H is lower than that in a case where the horizontally polarized receiver 30H receives a radio wave with horizontal polarization, because the radio wave received by the horizontally polarized receiver 30H is a radio wave with left-hand circular polarization.

Further, if the horizontally polarized transmitter 20H transmits the radio wave WH with horizontal polarization and this radio wave WH enters the reflector RG, the reflector RG emits a radio wave with right-hand circular polarization toward the radar apparatus 10A (horizontal polarization-→right-hand circular polarization). Thus, the right-hand circularly polarized receiver 30R, the vertically polarized receiver 30V, and the horizontally polarized receiver 30H receive the radio wave reflected by the reflector RG, and the left-hand circularly polarized receiver 30L hardly receives the radio wave reflected by the reflector RG. The reception level at the vertically polarized receiver 30V is lower than that in a case where the vertically polarized receiver 30V receives a radio wave with vertical polarization, because the radio wave received by the vertically polarized receiver 30V is a radio wave with right-hand circular polarization. Similarly, the reception level at the horizontally polarized receiver 30H is lower than that in a case where the horizontally polarized receiver 30H receives a radio wave with horizontal polarization, because the radio wave received by the horizontally polarized receiver 30H is a radio wave with right-hand circular polarization.

Figure 18:
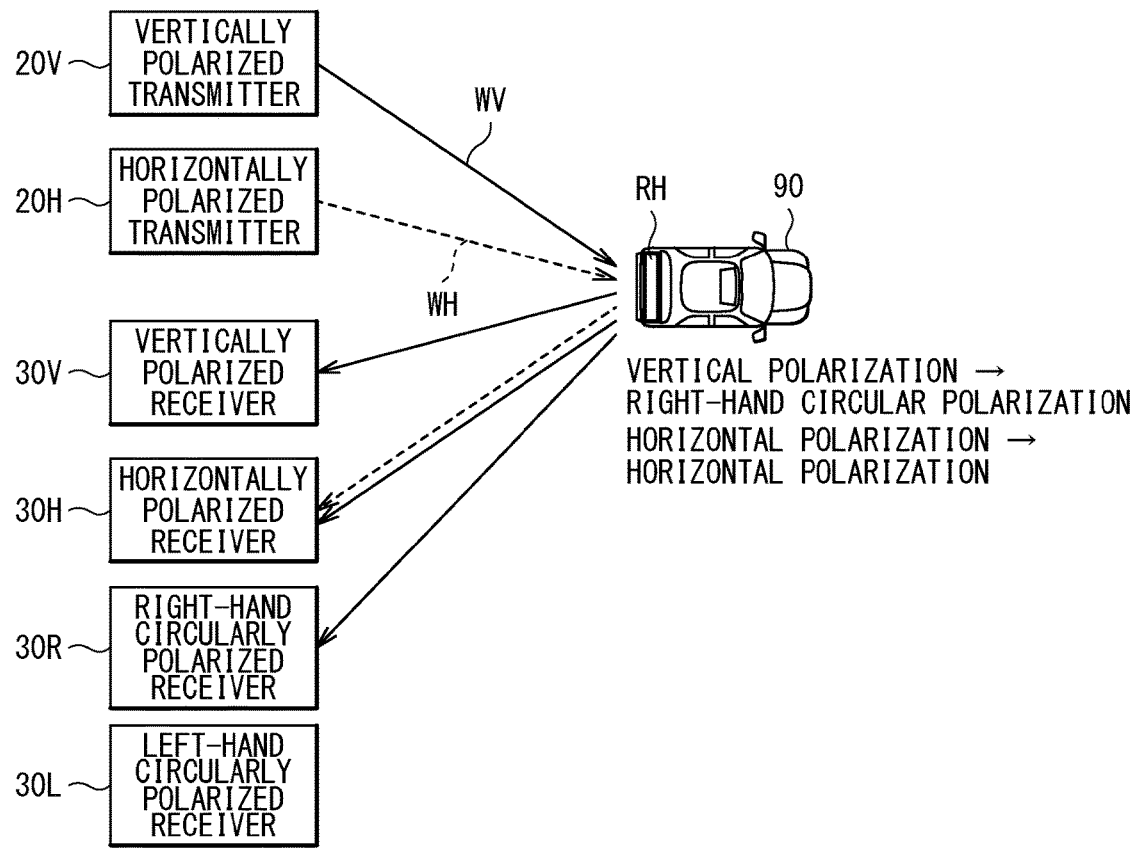
FIG. 18 is an explanatory diagram illustrating another operation example of the radar system according to the modification example.

FIG. 18 illustrates an operation example of the radar system 1A in a case where the reflector RH is used as the reflector 91.

If the vertically polarized transmitter 20V transmits the radio wave WV with vertical polarization and this radio wave WV enters the reflector RH, the reflector RH emits a radio wave with right-hand circular polarization toward the radar apparatus 10A (vertical polarization→right-hand circular polarization). Thus, the right-hand circularly polarized receiver 30R, the vertically polarized receiver 30V, and the horizontally polarized receiver 30H receive the radio wave reflected by the reflector RH, and the left-hand circularly polarized receiver 30L hardly receives the radio wave reflected by the reflector RH. The reception level at the vertically polarized receiver 30V is lower than that in a case where the vertically polarized receiver 30V receives a radio wave with vertical polarization, because the radio wave received by the vertically polarized receiver 30V is a radio wave with right-hand circular polarization. Similarly, the reception level at the horizontally polarized receiver 30H is lower than that in a case where the horizontally polarized receiver 30H receives a radio wave with horizontal polarization, because the radio wave received by the horizontally polarized receiver 30H is a radio wave right-hand circular polarization.

Further, if the horizontally polarized transmitter 20H transmits the radio wave WH with horizontal polarization and this radio wave WH enters the reflector RH, the reflector RH emits a radio wave with horizontal polarization toward the radar apparatus 10A (horizontal polarization→horizontal polarization). Thus, the horizontally polarized receiver 30H receives the radio wave reflected by the reflector RH, and the vertically polarized receiver 30V, the right-hand circularly polarized receiver 30R, and the left-hand circularly polarized receiver 30L hardly receive the radio wave reflected by the reflector RH.

Figure 19:
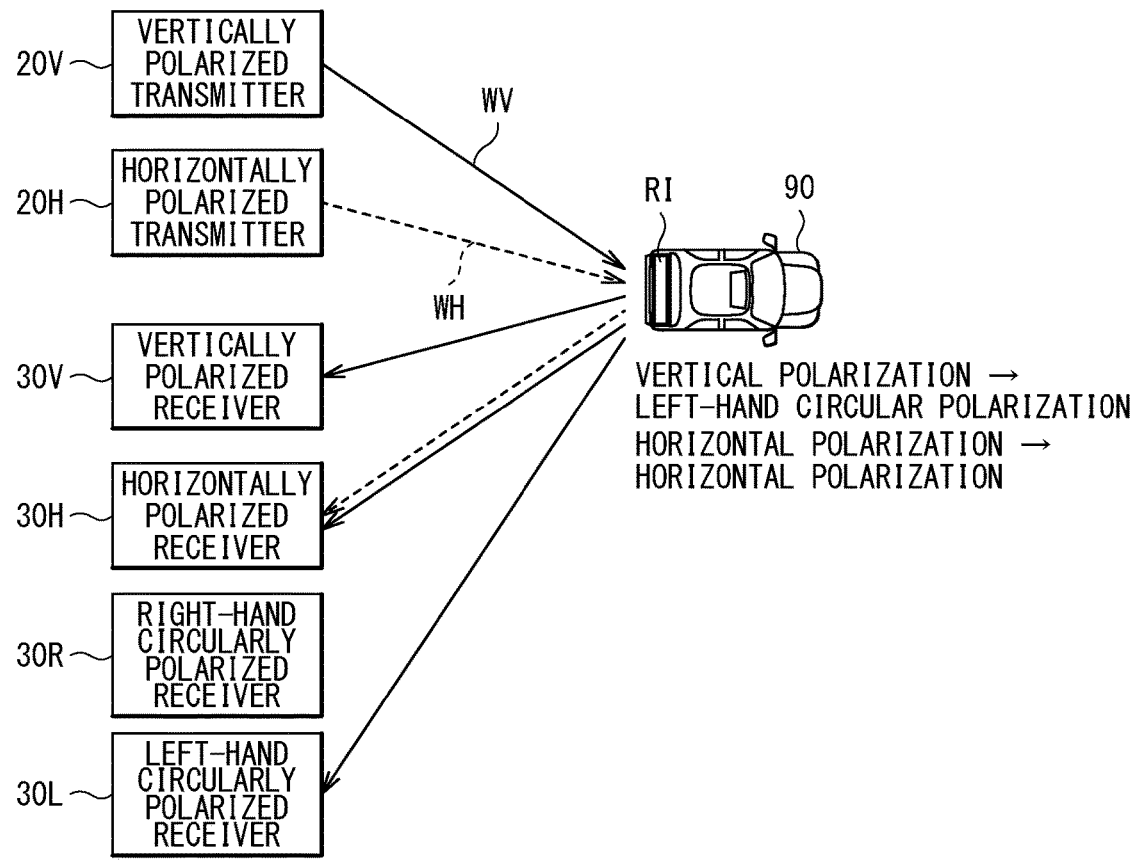
FIG. 19 is an explanatory diagram illustrating another operation example of the radar system according to the modification example.

FIG. 19 illustrates an operation example of the radar system 1A in a case where the reflector RI is used as the reflector 91.

If the vertically polarized transmitter 20V transmits the radio wave WV with vertical polarization and this radio wave WV enters the reflector RI, the reflector RI emits a radio wave with left-hand circular polarization toward the radar apparatus 10A (vertical polarization→left-hand circular polarization). Thus, the left-hand circularly polarized receiver 30L, the vertically polarized receiver 30V, and the horizontally polarized receiver 30H receive the radio wave reflected by the reflector RI, and the right-hand circularly polarized receiver 30R hardly receives the radio wave reflected by the reflector RI. The reception level at the vertically polarized receiver 30V is lower than that in a case where the vertically polarized receiver 30V receives a radio wave with vertical polarization, because the radio wave received by the vertically polarized receiver 30V is a radio wave with left-hand circular polarization. Similarly, the reception level at the horizontally polarized receiver 30H is lower than that in a case where the horizontally polarized receiver 30H receives a radio wave with horizontal polarization, because the radio wave received by the horizontally polarized receiver 30H is a radio wave with left-hand circular polarization.

Further, if the horizontally polarized transmitter 20H transmits the radio wave WH with horizontal polarization and this radio wave WH enters the reflector RI, the reflector RI emits a radio wave with horizontal polarization toward the radar apparatus 10A (horizontal polarization→horizontal polarization). Thus, the horizontally polarized receiver 30H receives the radio wave reflected by the reflector RI, and the vertically polarized receiver 30V, the right-hand circularly polarized receiver 30R, and the left-hand circularly polarized receiver 30L hardly receive the radio wave reflected by the reflector RI.

Figure 20:
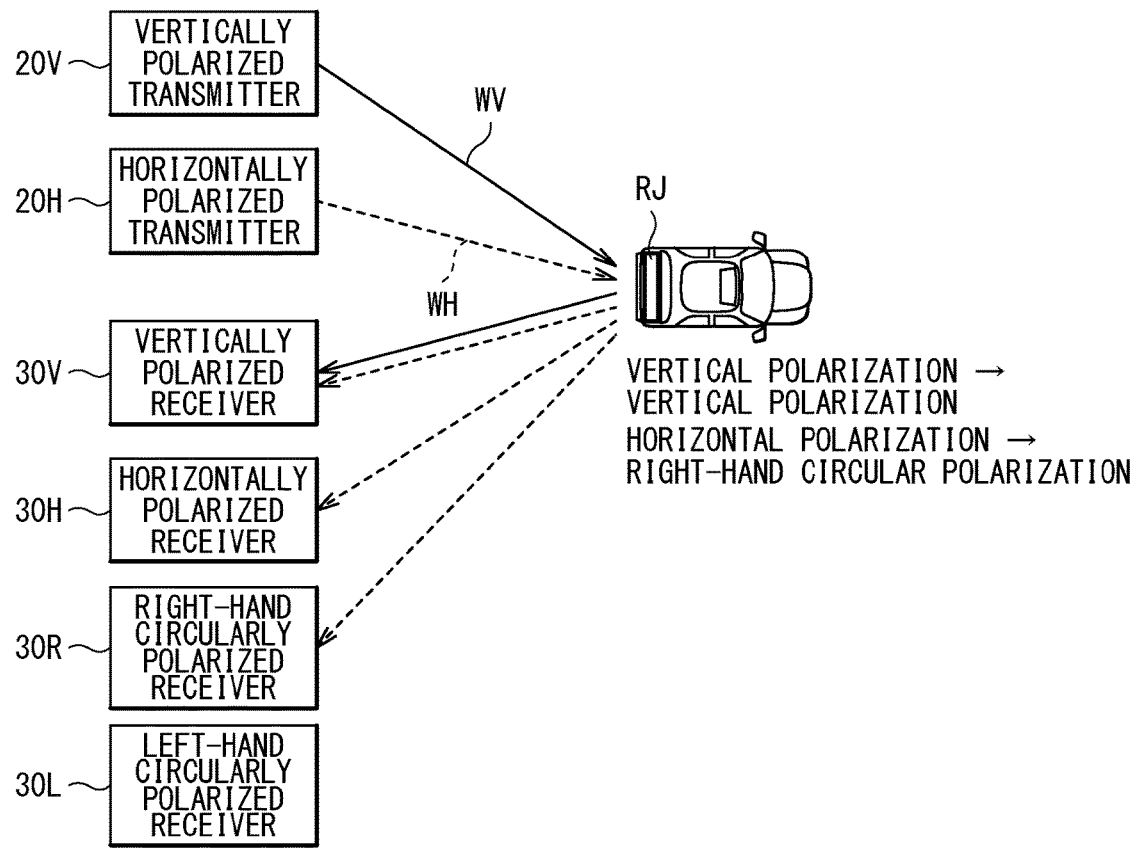
FIG. 20 is an explanatory diagram illustrating another operation example of the radar system according to the modification example.

FIG. 20 illustrates an operation example of the radar system 1A in a case where the reflector RJ is used as the reflector 91.

If the vertically polarized transmitter 20V transmits the radio wave WV with vertical polarization and this radio wave WV enters the reflector RJ, the reflector RJ emits a radio wave with vertical polarization toward the radar apparatus 10A (vertical polarization→vertical polarization). Thus, the vertically polarized receiver 30V receives the radio wave reflected by the reflector RJ, and the horizontally polarized receiver 30H, the right-hand circularly polarized receiver 30R, and the left-hand circularly polarized receiver 30L hardly receive the radio wave reflected by the reflector RJ.

Further, if the horizontally polarized transmitter 20H transmits the radio wave WH with horizontal polarization and this radio wave WH enters the reflector RJ, the reflector RJ emits a radio wave with right-hand circular polarization toward the radar apparatus 10A (horizontal polarization-→right-hand circular polarization). Thus, the right-hand circularly polarized receiver 30R, the vertically polarized receiver 30V, and the horizontally polarized receiver 30H receive the radio wave reflected by the reflector RJ, and the left-hand circularly polarized receiver 30L hardly receives the radio wave reflected by the reflector RJ, The reception level at the vertically polarized receiver 30V is lower than that in a case where the vertically polarized receiver 30V receives a radio wave with vertical polarization, because the radio wave received by the vertically polarized receiver 30V is a radio wave with right-hand circular polarization. Similarly, the reception level at the horizontally polarized receiver 30H is lower than that in a case where the horizontally polarized receiver 30H receives a radio wave with horizontal polarization, because the radio wave received by the horizontally polarized receiver 30H is a radio wave with right-hand circular polarization.

Figure 21:
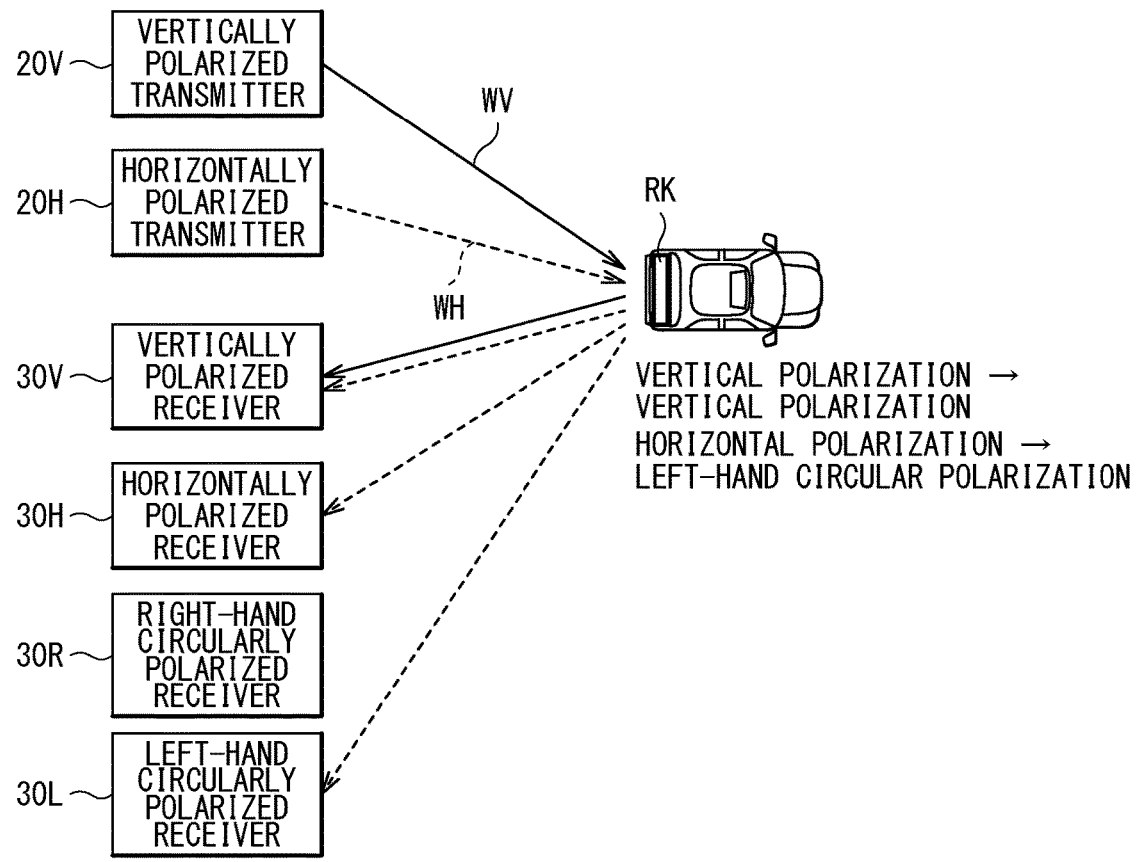
FIG. 21 is an explanatory diagram illustrating another operation example of the radar system according to the modification example.

FIG. 21 illustrates an operation example of the radar system 1A in a case where the reflector RK is used as the reflector 91.

If the vertically polarized transmitter 20V transmits the radio wave WV with vertical polarization and this radio wave WV enters the reflector RK, the reflector RK emits a radio wave with vertical polarization toward the radar apparatus 10A (vertical polarization→vertical polarization). Thus, the vertically polarized receiver 30V receives the radio wave reflected by the reflector RK, and the horizontally polarized receiver 30H, the right-hand circularly polarized receiver 30R, and the left-hand circularly polarized receiver 30L hardly receive the radio wave reflected by the reflector RK.

Further, if the horizontally polarized transmitter 20H transmits the radio wave WH with horizontal polarization and this radio wave WH enters the reflector RK, the reflector RK emits a radio wave with left-hand circular polarization toward the radar apparatus 10A (horizontal polarization left-hand circular polarization). Thus, the left-hand circularly polarized receiver 30L, the vertically polarized receiver 30V, and the horizontally polarized receiver 30H receive the radio wave reflected by the reflector RK, and the right-hand circularly polarized receiver 30R hardly receives the radio wave reflected by the reflector RK. The reception level at the vertically polarized receiver 30V is lower than that in a case where the vertically polarized receiver 30V receives a radio wave with vertical polarization, because the radio wave received by the vertically polarized receiver 30V is a radio wave with left-hand circular polarization. Similarly, the reception level at the horizontally polarized receiver 30H is lower than that in a case where the horizontally polarized receiver 30H receives a radio wave with horizontal polarization, because the radio wave received by the horizontally polarized receiver 30H is a radio wave with left-hand circular polarization.

As described above with reference to FIGS. 8 to 12 and 16 to 21, in the radar system 1A, the reception levels at the vertically polarized receiver 30V, the horizontally polarized receiver 30H, the right-hand circularly polarized receiver 30R, and the left-hand circularly polarized receiver 30L differ depending on whether the reflector 91 is installed in the other vehicle and which type of the reflector 91 is installed in a case where the reflector 91 is installed. This enables the processor 12A to detect the reflector 91 on the basis of information as to which of the vertically polarized transmitter 20V and the horizontally polarized transmitter 20H is operating, and the respective reception levels at the vertically polarized receiver 30V, the horizontally polarized receiver 30H, the right-hand circularly polarized receiver 30R, and the left-hand circularly polarized receiver 30L. Thus, it is possible in the radar system 1A to identify the vehicle 90, for example.

Figure 22:
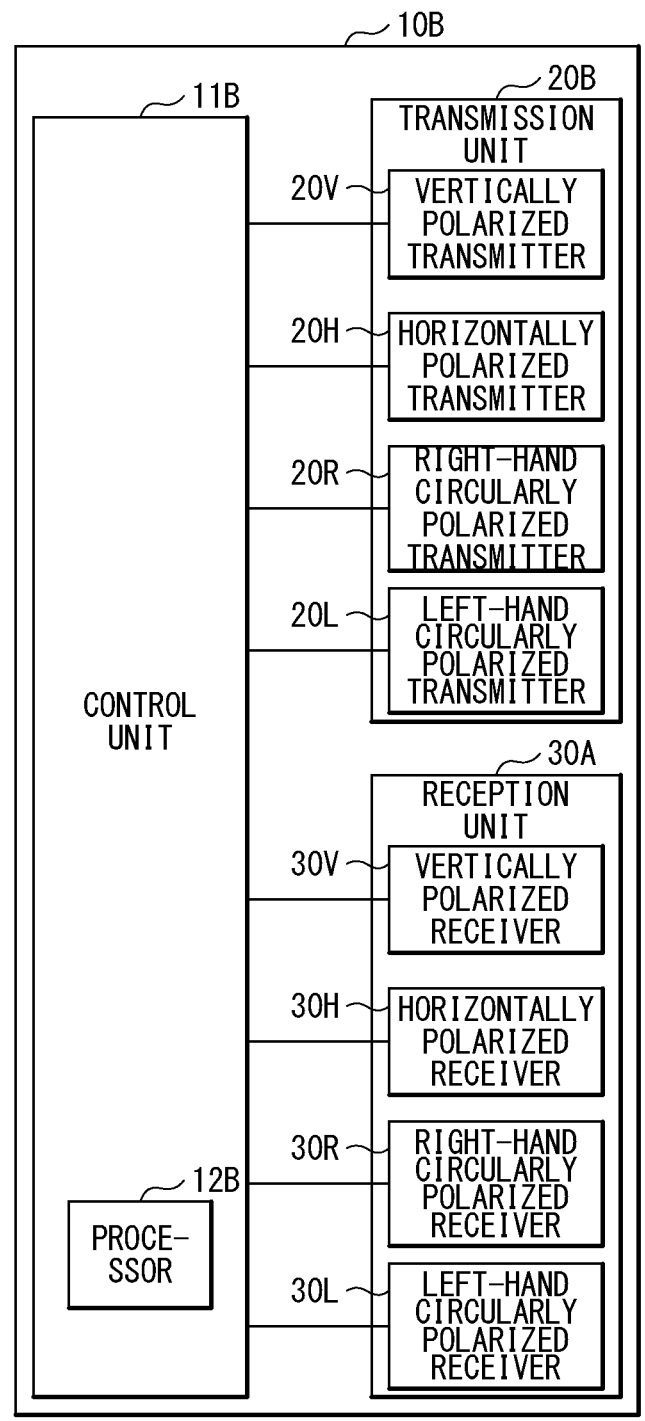
FIG. 22 is a block diagram illustrating a configuration example of a radar apparatus according to another modification example.

It is to be noted that, in this example, the transmission unit 20 includes two transmitters (the vertically polarized transmitter 20V and the horizontally polarized transmitter 20H) and the reception unit 30A includes four receivers (the vertically polarized receiver 30V, the horizontally polarized receiver 30H, the right-hand circularly polarized receiver 30R, and the left-hand circularly polarized receiver 30L), but this is not limitative. For example, as in a radar apparatus 10B illustrated in FIG. 22, a transmission unit may include four transmitters. This radar apparatus 10B includes a transmission unit 20B, the reception unit 30A, and a control unit 11B.

The transmission unit 20B transmits radio waves on the basis of an instruction from the control unit 11B. The transmission unit 20B includes the vertically polarized transmitter 20V, the horizontally polarized transmitter 20H, a right-hand circularly polarized transmitter 20R, and a left-hand circularly polarized transmitter 20L. The right-hand circularly polarized transmitter 20R transmits a radio wave WR with right-hand circular polarization. The left-hand circularly polarized transmitter 20L transmits a radio wave WL with left-hand circular polarization. The vertically polarized transmitter 20V, the horizontally polarized transmitter 20H, the right-hand circularly polarized transmitter 20R, and the left-hand circularly polarized transmitter 20L are configured to cyclically transmit the radio wave WV, the radio wave WH, the radio wave WR, and the radio wave WL on the basis of the instruction from the control unit 11B by, for example, operating cyclically in time division.

The control unit 11B controls operation of the transmission unit 20B and the reception unit 30A. Specifically, the control unit 11B performs control to cause the vertically polarized transmitter 20V, the horizontally polarized transmitter 20H, the right-hand circularly polarized transmitter 20R, and the left-hand circularly polarized transmitter 20L to operate cyclically in time division, and performs control to cause the vertically polarized receiver 30V, the horizontally polarized receiver 30H, the right-hand circularly polarized receiver 30R, and the left-hand circularly polarized receiver 30L to continuously operate at all times. The control unit 11B includes a processor 12B. The processor 12B detects the position of the vehicle 90, which is the detection target, on the basis of a result of the reception by the reception unit 30A, Further, the processor 12B also has a function of identifying, for example, the vehicle 90 on the basis of information as to which transmitter of the vertically polarized transmitter 20V, the horizontally polarized transmitter 20H, the right-hand circularly polarized transmitter 20R, and the left-hand circularly polarized transmitter 20L in the transmission unit 20 is operating and respective reception levels at the vertically polarized receiver 30V, the horizontally polarized receiver 30H, the right-hand circularly polarized receiver 30R, and the left-hand circularly polarized receiver 30L of the reception unit 30A.

2. Second Embodiment

Next, description will be given on a radar system 2 according to a second embodiment. In the present embodiment, one transmitter is used to configure a transmission unit. It is to be noted that substantially the same components as those in the radar system 1 according to the first embodiment are denoted by the same reference numerals, and description thereof is omitted as appropriate.

Figure 23:
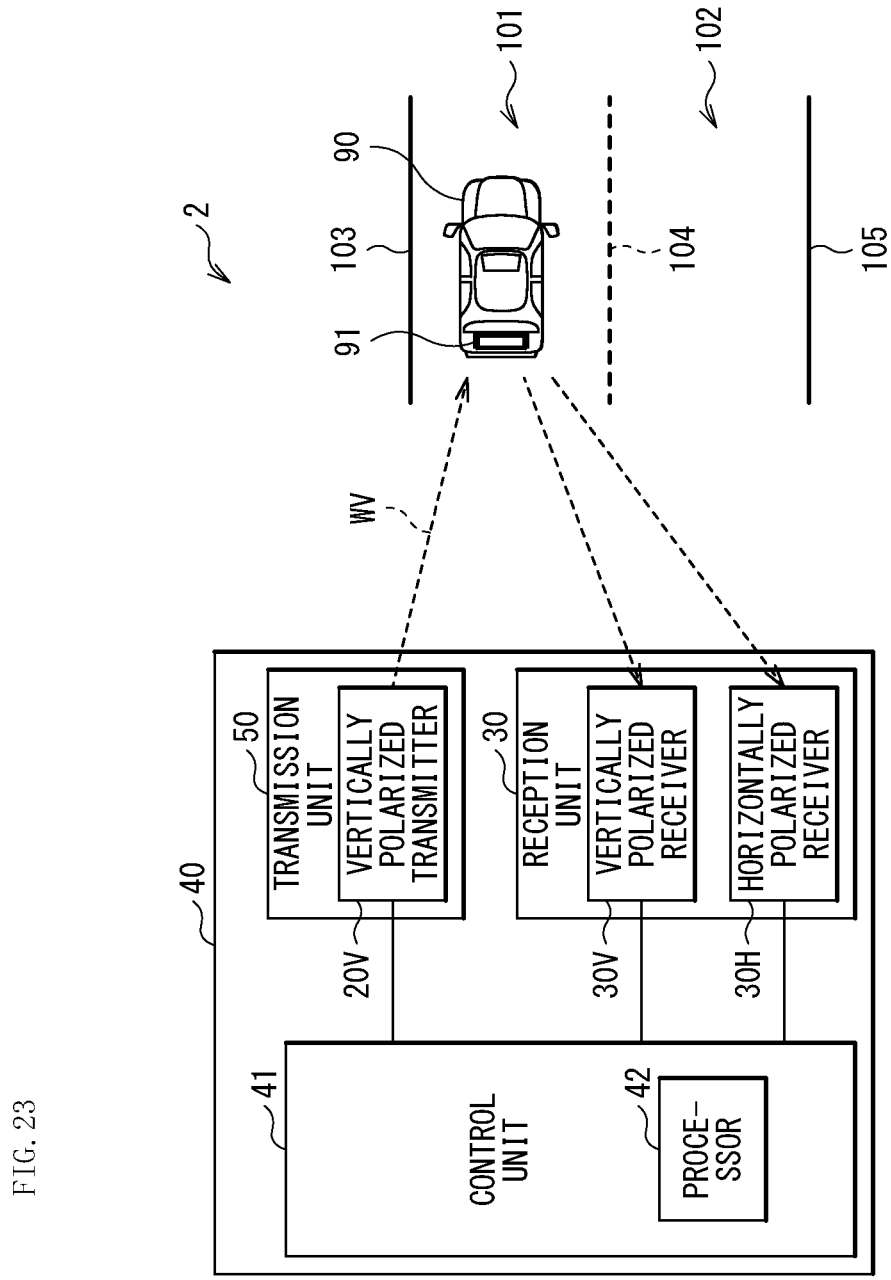
FIG. 23 is a configuration diagram illustrating a configuration example of a radar system according to a second embodiment.

FIG. 23 illustrates a configuration example of the radar system 2. The radar system 2 includes a radar apparatus 40. The radar apparatus 40 includes a transmission unit 50, the reception unit 30, and a control unit 41. The transmission unit 50 transmits a radio wave on the basis of an instruction from the control unit 41. The transmission unit 50 includes the vertically polarized transmitter 20V The control unit 41 controls operation of the transmission unit 50 and the reception unit 30. The control unit 41 includes a processor 42. The processor 42 detects the position of the vehicle 90, which is the detection target, on the basis of the result of the reception by the reception unit 30. Further, the processor 42 is configured to identify, for example, the vehicle 90 on the basis of the respective reception levels at the vertically polarized receiver 30V and the horizontally polarized receiver 30H.

As the reflector 91 installed in the vehicle 90, it is possible to use one of a plurality of types of reflectors (two types of reflectors RA2 and RB2 in this example).

Figures 24, 25:
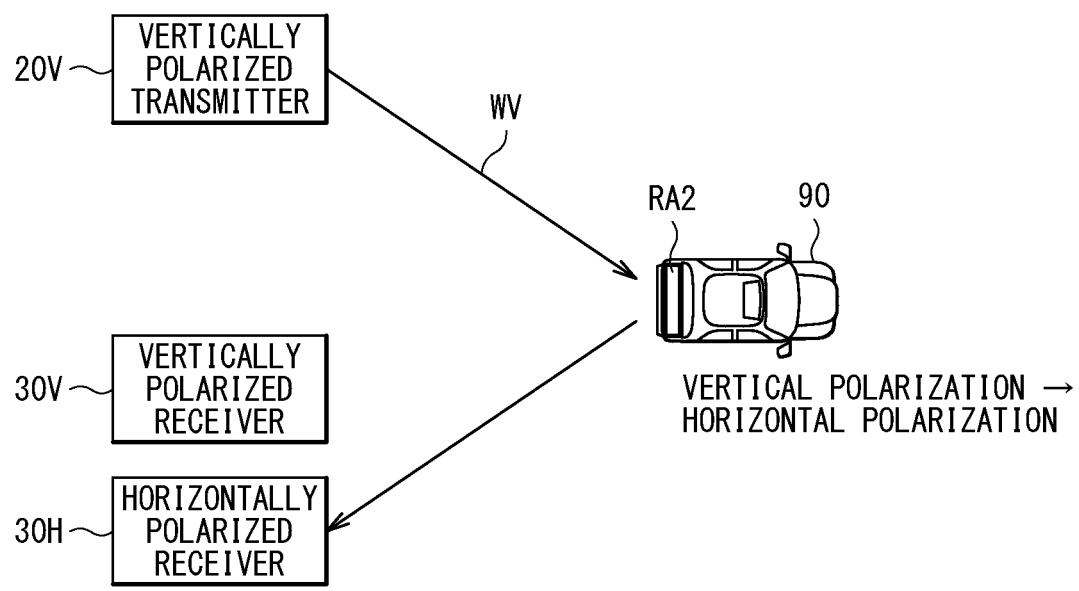
FIG. 24 is a table illustrating examples of characteristics of various reflectors according to the second embodiment.
FIG. 25 is an explanatory diagram illustrating an operation example of the radar system illustrated in FIG. 23.

FIG. 24 illustrates examples of the two types of reflectors RA2 and RB2. The reflector RA2 emits a radio wave with horizontal polarization toward the radar apparatus 10 in a case where the radio wave WV transmitted from the vertically polarized transmitter 20V enters (vertical polarization-→horizontal polarization). The reflector RB2 emits a radio wave whose polarization plane is rotated by 45 degrees toward the radar apparatus 10 in a case where the radio wave WV transmitted from the vertically polarized transmitter 20V enters (vertical polarization→45-degree polarization).

FIG. 25 illustrates an operation example of the radar system 2 in a case where the reflector RA2 is used as the reflector 91. If the vertically polarized transmitter 20V transmits the radio wave WV with vertical polarization and this radio wave WV enters the reflector RA2, the reflector RA2 emits a radio wave with horizontal polarization toward the radar apparatus 40 (vertical polarization→horizontal polarization). Thus, the vertically polarized receiver 30V hardly receives the radio wave reflected by the reflector RA, and the horizontally polarized receiver 30H receives the radio wave reflected by the reflector RA.

Figure 26:
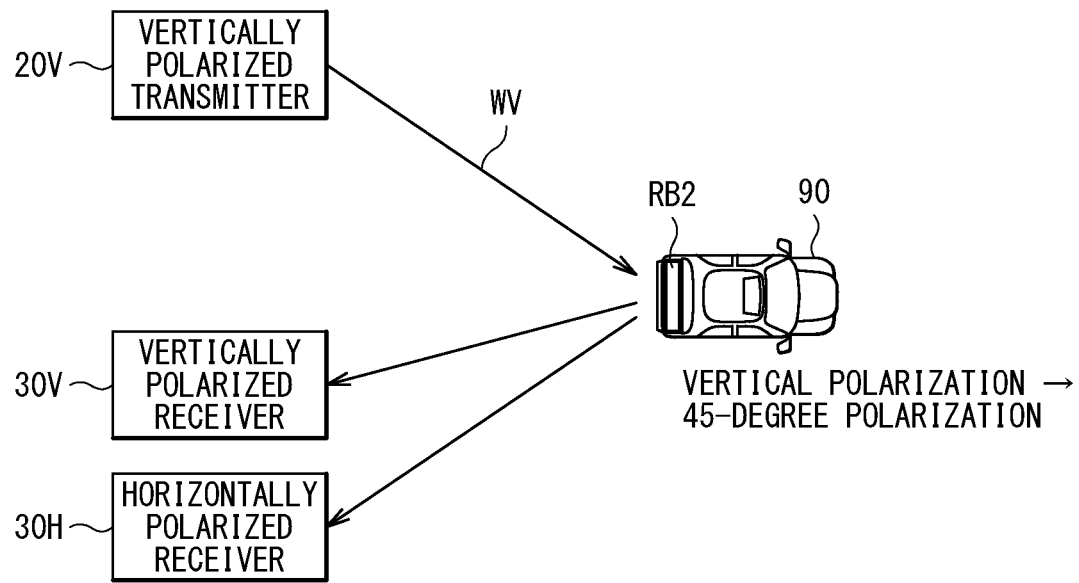
FIG. 26 is an explanatory diagram illustrating another operation example of the radar system illustrated in FIG. 23.

FIG. 26 illustrates an operation example of the radar system 2 in a case where the reflector RB2 is used as the reflector 91. If the vertically polarized transmitter 20V transmits the radio wave WV with vertical polarization and this radio wave WV enters the reflector RB2, the reflector RB2 emits a radio wave with 45-degree polarization toward the radar apparatus 40 (vertical polarization→45-degree polarization). Thus, the vertically polarized receiver 30V and the horizontally polarized receiver 30H receive the radio wave reflected by the reflector RB2. The reception level at the vertically polarized receiver 30V is lower than that in a case where the vertically polarized receiver 30V receives a radio wave with vertical polarization, because the radio wave received by the vertically polarized receiver 30V is a radio wave with 45-degree polarization. Similarly, the reception level at the horizontally polarized receiver 30H is lower than that in a case where the horizontally polarized receiver 30H receives a radio wave with horizontal polarization, because the radio wave received by the horizontally polarized receiver 30H is a radio wave with 45-degree polarization. The reception level at the vertically polarized receiver 30V and the reception level at the horizontally polarized receiver 30H are substantially equal to each other.

Figure 27:
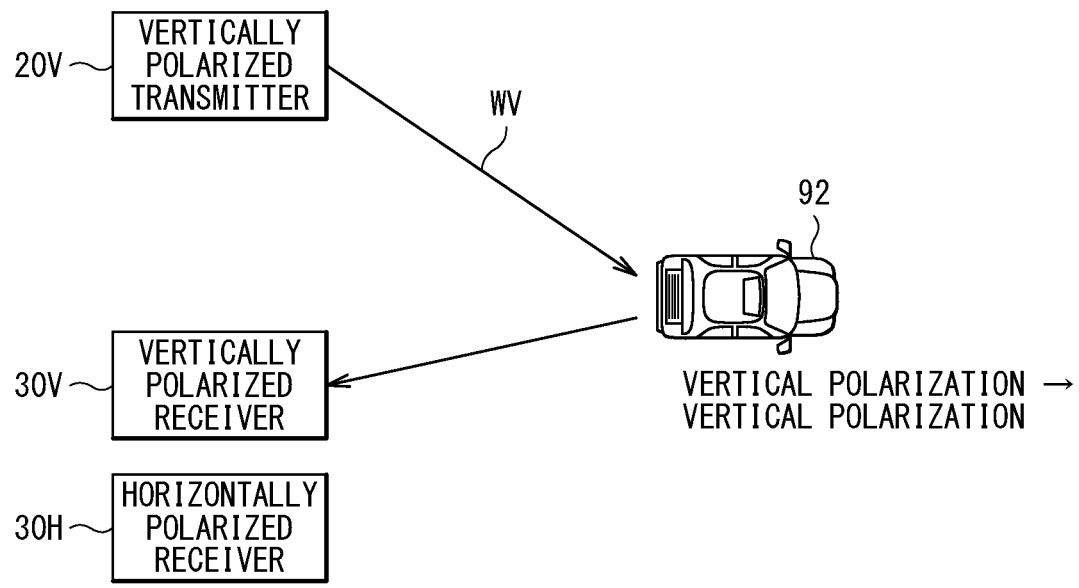
FIG. 27 is an explanatory diagram illustrating another operation example of the radar system illustrated in FIG. 23.

FIG. 27 illustrates an operation example of the radar system 2 in a case where no reflector is installed in a vehicle (vehicle 92). If the vertically polarized transmitter 20V transmits the radio wave WV with vertical polarization and this radio wave WV enters a body of the vehicle 92, the body of the vehicle 92 emits a radio wave with vertical polarization (vertical polarization→vertical polarization). Thus, the vertically polarized receiver 30V receives the radio wave reflected by the body of the vehicle 92, and the horizontally polarized receiver 30H hardly receives the radio wave reflected by the body of the vehicle 92.

As described above, in the radar system 2, the reception unit 30 receives a radio wave with vertical polarization and a radio wave with horizontal polarization. Then, the control unit 41 detects the reflector 91 on the basis of the respective reception levels at the vertically polarized receiver 30V and the horizontally polarized receiver 30H. Thus, it is possible in the radar system 2 to identify the vehicle 90, for example.

Further, in the radar system 2, the reception unit 30 receives a radio wave with vertical polarization and a radio wave with horizontal polarization, and the reflector 91 that changes polarization characteristics of radio waves is used. This makes it possible to suppress influence of clutter, for example, or radio waves transmitted from an oncoming vehicle, making it possible to enhance detection accuracy.

As described above, in the present embodiment, the reception unit receives a radio wave with vertical polarization and a radio wave with horizontal polarization. This makes it possible to identify the detection target and enhance detection accuracy.

[Modification Example 2-1]

In the above embodiment, the transmission unit 50 is configured by using the vertically polarized transmitter 20V, but this is not limitative. Alternatively, for example, the horizontally polarized transmitter 20H may be used to configure a transmission unit.

[Modification Example 2-2]

The modification examples of the first embodiment may be applied to the radar system 2 according to the above embodiment.

3. Third Embodiment

Next, description will be given on a radar system 3 according to a third embodiment. In the present embodiment, one receiver is used to configure a reception unit. It is to be noted that substantially the same components as those in the radar system 1 according to the first embodiment are denoted by the same reference numerals, and description thereof is omitted as appropriate.

Figure 28:
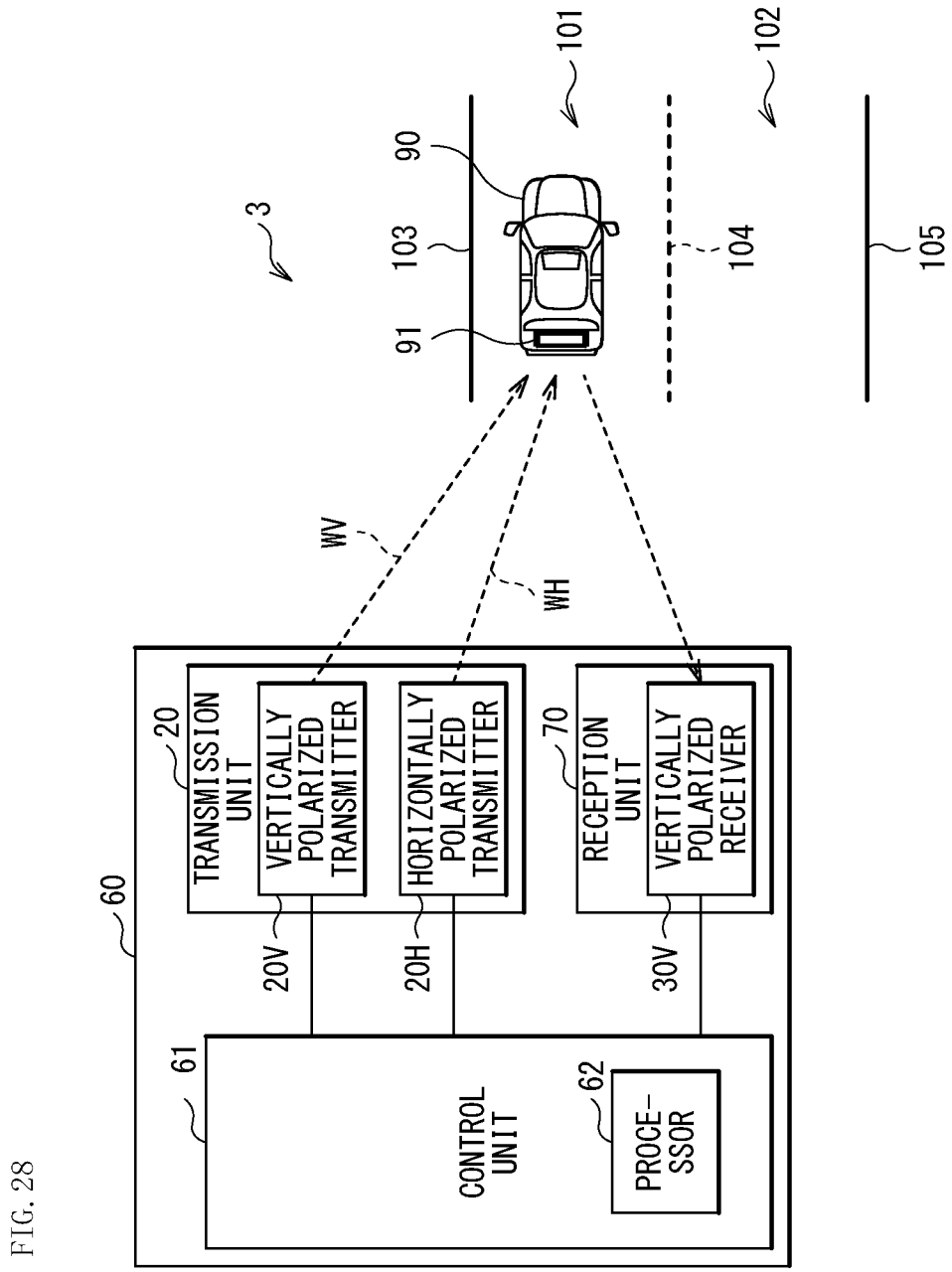
FIG. 28 is a configuration diagram illustrating a configuration example of a radar system according to a third embodiment.

FIG. 28 illustrates a configuration example of the radar system 3. The radar system 3 includes a radar apparatus 60. The radar apparatus 60 includes the transmission unit 20, a reception unit 70, and a control unit 61. The reception unit 70 receives a radio wave on the basis of an instruction from the control unit 61. The reception unit 70 includes the vertically polarized receiver 30V. The control unit 61 controls operation of the transmission unit 20 and the reception unit 70. The control unit 61 includes a processor 62. The processor 62 detects the position of the vehicle 90, which is the detection target, on the basis of the result of the reception by the reception unit 70. Further, the processor 62 also has a function of identifying, for example, the vehicle 90 on the basis of information as to which of the vertically polarized transmitter 20V and the horizontally polarized transmitter 20H in the transmission unit 20 is operating, and a reception level at the vertically polarized receiver 30V.

As the reflector 91 installed in the vehicle 90, it is possible to use one of a plurality of types of reflectors (in this example, the five types of reflectors RA to RE illustrated in FIG. 3).

Figure 29:
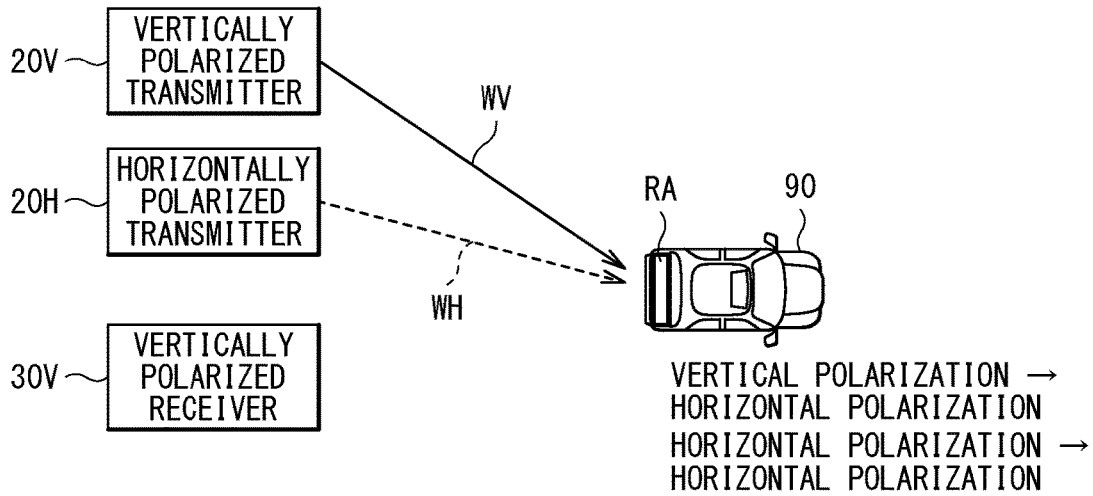
FIG. 29 is an explanatory diagram illustrating an operation example of the radar system illustrated in FIG. 28.

FIG. 29 illustrates an operation example of the radar system 3 in a case where the reflector RA is used as the reflector 91.

If the vertically polarized transmitter 20V transmits the radio wave WV with vertical polarization and this radio wave WV enters the reflector RA, the reflector RA emits a radio wave with horizontal polarization toward the radar apparatus 60 (vertical polarization→horizontal polarization). Thus, the vertically polarized receiver 30V hardly receives the radio wave reflected by the reflector RA.

Further, if the horizontally polarized transmitter 20H transmits the radio wave WH with horizontal polarization, and this radio wave WH enters the reflector RA, the reflector RA emits a radio wave with horizontal polarization toward the radar apparatus 60 (horizontal polarization→horizontal polarization). Thus, the vertically polarized receiver 30V hardly receives the radio wave reflected by the reflector RA.

Figure 30:
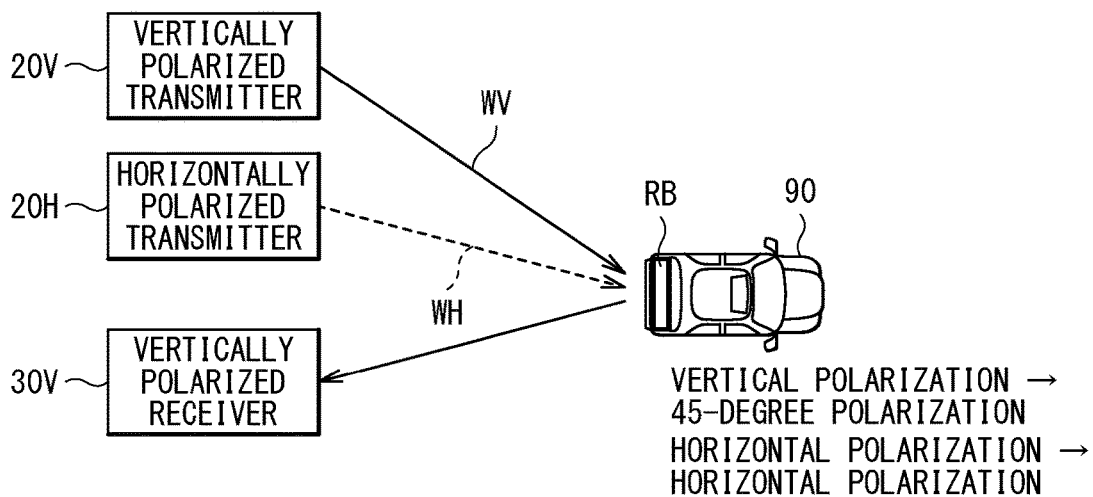
FIG. 30 is an explanatory diagram illustrating another operation example of the radar system illustrated in FIG. 28.

FIG. 30 illustrates an operation example of the radar system 3 in a case where the reflector RB is used as the reflector 91.

If the vertically polarized transmitter 20V transmits radio wave WV with vertical polarization and this radio wave WV enters the reflector RB, the reflector RB emits a radio wave with 45-degree polarization toward the radar apparatus 60 (vertical polarization→45-degree polarization). Thus, the vertically polarized receiver 30V receives the radio wave reflected by the reflector RB. The reception level at the vertically polarized receiver 30V is lower than that in a case where the vertically polarized receiver 30V receives a radio wave with vertical polarization, because the radio wave received by the vertically polarized receiver 30V is a radio wave with 45-degree polarization.

Further, if the horizontally polarized transmitter 20H transmits the radio wave WH with horizontal polarization, and this radio wave WH enters the reflector RB, the reflector RB emits a radio wave with horizontal polarization toward the radar apparatus 60 (horizontal polarization→horizontal polarization). Thus, the vertically polarized receiver 30V hardly receives the radio wave reflected by the reflector RB.

Figure 31:
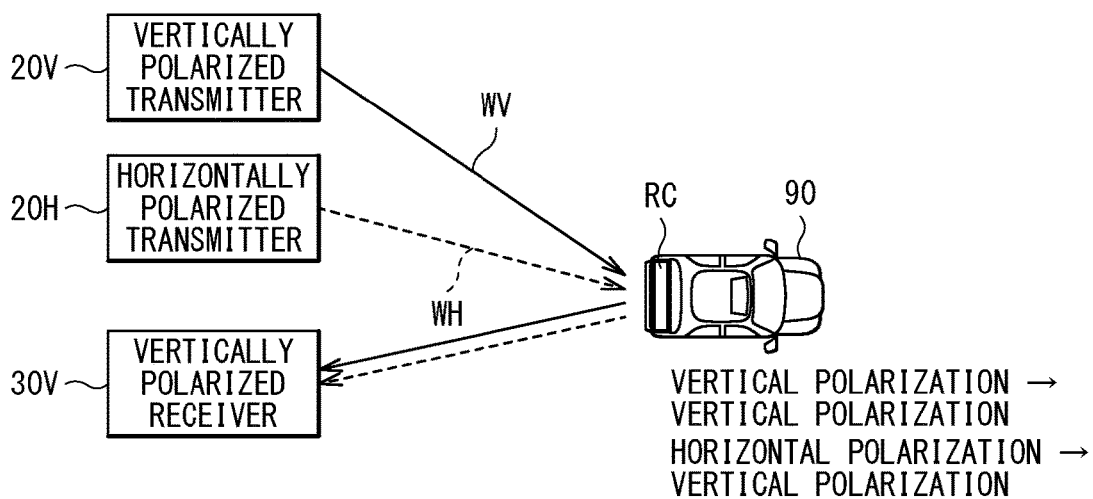
FIG. 31 is an explanatory diagram illustrating another operation example of the radar system illustrated in FIG. 28.

FIG. 31 illustrates an operation example of the radar system 3 in a case where the reflector RC is used as the reflector 91.

If the vertically polarized transmitter 20V transmits the radio wave WV with vertical polarization and this radio wave WV enters the reflector RC, the reflector RC emits a radio wave with vertical polarization toward the radar apparatus 60 (vertical polarization→vertical polarization). Thus, the vertically polarized receiver 30V receives the radio wave reflected by the reflector RC.

Further, if the horizontally polarized transmitter 20H transmits the radio wave WH with horizontal polarization, and this radio wave WH enters the reflector RC, the reflector RC emits a radio wave with vertical polarization toward the radar apparatus 60 (horizontal polarization→vertical polarization). Thus, the vertically polarized receiver 30V receives the radio wave reflected by reflector RC.

Figure 32:
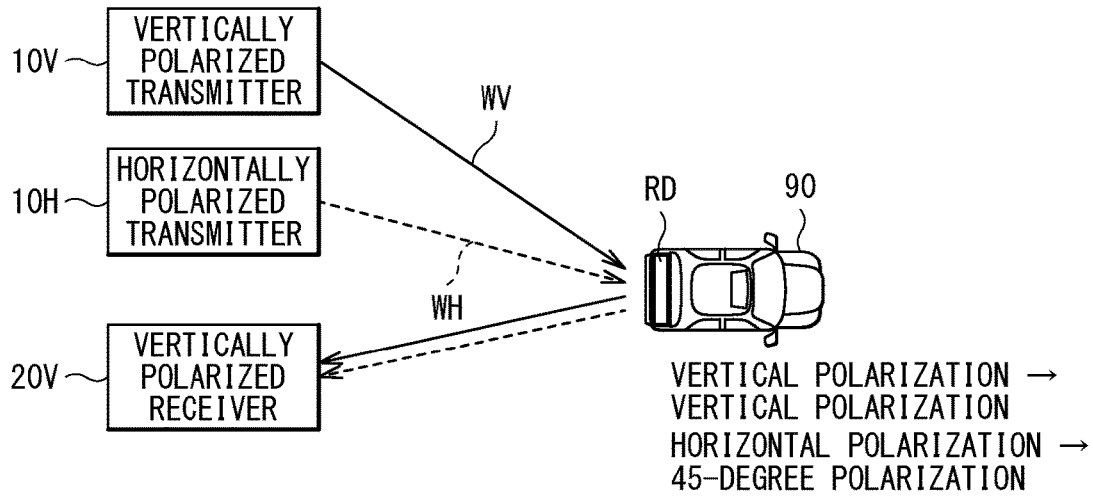
FIG. 32 is an explanatory diagram illustrating another operation example of the radar system illustrated in FIG. 28.

FIG. 32 illustrates an operation example of the radar system 3 in a case where the reflector RD is used as the reflector 91.

If the vertically polarized transmitter 20V transmits the radio wave WV with vertical polarization and this radio wave WV enters the reflector RD, the reflector RD emits a radio wave with vertical polarization toward the radar apparatus 60 (vertical polarization→vertical polarization). Thus, the vertically polarized receiver 30V receives the radio wave reflected by the reflector RD.

Further, if the horizontally polarized transmitter 20H transmits the radio wave WH with horizontal polarization, and this radio wave WH enters the reflector RD, the reflector RD emits a radio wave with 45-degree polarization toward the radar apparatus 60 (horizontal polarization→45-degree polarization). Thus, the vertically polarized receiver 30V receives the radio wave reflected by the reflector RD. The reception level at the vertically polarized receiver 30V is lower than that in a case where the vertically polarized receiver 30V receives a radio wave with vertical polarization, because the radio wave received by the vertically polarized receiver 30V is a radio wave with 45-degree polarization. In other words, the reception level at the vertically polarized receiver 30V is lower than the reception level in a case where the radio wave is reflected by the reflector RC (FIG. 31).

Figure 33:
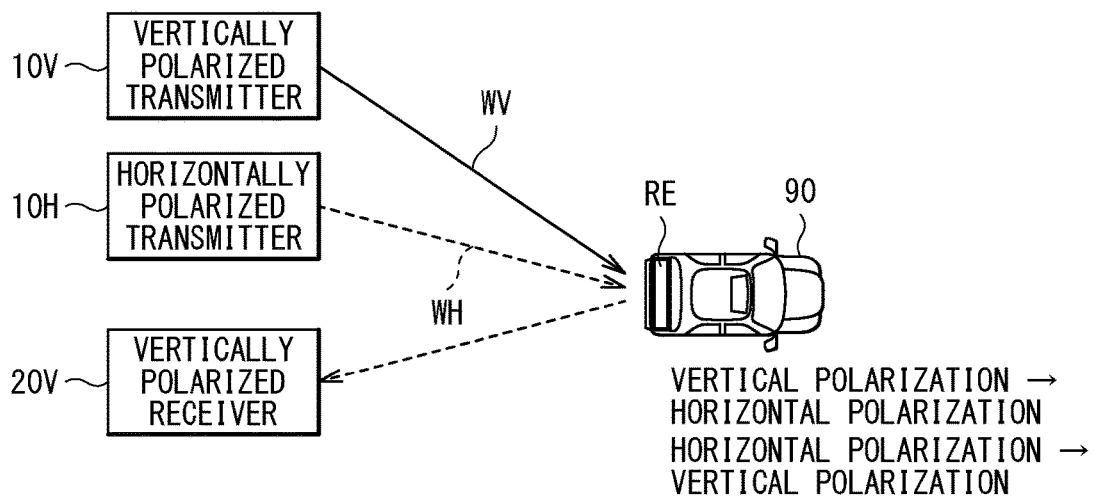
FIG. 33 is an explanatory diagram illustrating another operation example of the radar system illustrated in FIG. 28.

FIG. 33 illustrates an operation example of the radar system 3 in a case where the reflector RE is used as the reflector 91.

If the vertically polarized transmitter 20V transmits the radio wave WV with vertical polarization and this radio wave WV enters the reflector RE, the reflector RE emits a radio wave with horizontal polarization toward the radar apparatus 60 (vertical polarization→horizontal polarization). Thus, the vertically polarized receiver 30V hardly receives the radio wave reflected by the reflector RE.

Further, if the horizontally polarized transmitter 20H transmits the radio wave WH with horizontal polarization, and this radio wave WH enters the reflector RE, the reflector RE emits a radio wave with vertical polarization toward the radar apparatus 60 (horizontal polarization→vertical polarization). Thus, the vertically polarized receiver 30V receives the radio wave reflected by the reflector RE.

Figure 34:
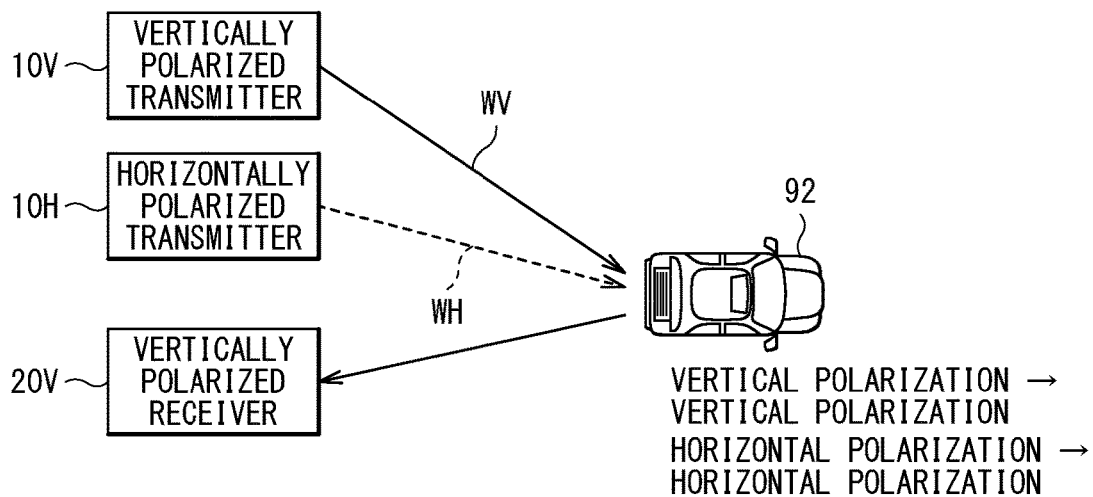
FIG. 34 is an explanatory diagram illustrating another operation example of the radar system illustrated in FIG. 28.

FIG. 34 illustrates an operation example of the radar system 1 in a case where no reflector is installed in a vehicle (vehicle 92).

If the vertically polarized transmitter 20V transmits the radio wave WV with vertical polarization and this radio wave WV enters the body of the vehicle 92, the body of the vehicle 92 emits a radio wave with vertical polarization (vertical polarization→vertical polarization). Therefore, the vertically polarized receiver 30V receives the radio wave reflected by the body of the vehicle 92. The reception level at the vertically polarized receiver 30V differs from the reception level in a case where the radio wave is reflected by the reflector RB (FIG. 30), because the vertically polarized receiver 30V receives the radio wave reflected by the body of the vehicle 92.

Further, if the horizontally polarized transmitter 20H transmits the radio wave WH with horizontal polarization, and this radio wave WH enters the body of the vehicle 92, the body of the vehicle 92 emits a radio wave with horizontal polarization (horizontal polarization→horizontal polarization). Thus, the vertically polarized receiver 30V hardly receives the radio wave reflected by the body of the vehicle 92.

As described above, in the radar system 3, the transmission unit 20 transmits the radio wave WV with vertical polarization and the radio wave WH with horizontal polarization. Then, the processor 62 detects the reflector 91 on the basis of information as to which of the vertically polarized transmitter 20V and the horizontally polarized transmitter 20H in the transmission unit 20 is operating, and the reception level at the vertically polarized receiver 30V. Thus, it is possible in the radar system 3 to identify the vehicle 90, for example.

Further, in the radar system 3, the transmission unit 20 transmits a radio wave with vertical polarization and a radio wave with horizontal polarization, and the reflector 91 that changes polarization characteristics of radio waves is used. This makes it possible to suppress influence of clutter, for example, or radio waves transmitted from an oncoming vehicle, making it possible to enhance detection accuracy.

As described above, in the present embodiment, the transmission unit transmits a radio wave with vertical polarization and a radio wave with horizontal polarization. This makes it possible to identify the detection target and enhance detection accuracy.

[Modification Example 3-1]

In the above embodiment, the reception unit 70 is configured by using the vertically polarized receiver 30V, but this is not limitative. Alternatively, for example, the horizontally polarized receiver 30H may be used to configure a reception unit.

[Modification Example 3-2]

The modification examples of the first embodiment may be applied to the radar system 3 according to the above embodiment.

Although the present technology has been described above with reference to some embodiments and modification examples, the present technology is not limited to these embodiments, etc., and may be modified in a variety of ways.

For example, in the above embodiments, the present technology is applied to an automotive radar, but this is not limitative. The present technology is applicable to a variety of uses. Specifically, for example, the present technology may be used in a factory or the like.

It is to be noted that the effects described herein are merely illustrative and are not limitative, and may include other effects.

It is to be noted that the present technology may have the following configurations.

(1)

A radar apparatus including:

a transmission unit configured to transmit radio waves;

a reception unit including a first receiver configured to receive a first reflected radio wave and a second receiver configured to receive a second reflected radio wave, the first reflected radio wave and the second reflected radio wave having different polarization characteristics from each other and being included in reflected radio waves that are the radio waves reflected by a detection target; and a control unit configured to control operations of the transmission unit and the reception unit, and configured to identify the detection target on the basis of the operation of the transmission unit, a first reception level at the first receiver, and a second reception level at the second receiver.

(2)

The radar apparatus according to (1), in which the detection target includes a reflector configured to change polarization characteristics of the radio waves, and the reflected radio waves are the radio waves reflected by the reflector.

(3)

The radar apparatus according to (1) or (2), in which polarization of the first reflected radio wave and the second reflected radio wave is linear polarization, and an orientation of a polarization plane of the first reflected radio wave differs from an orientation of a polarization plane of the second reflected radio wave.

(4)

The radar apparatus according to (1) or (2), in which polarization of the first reflected radio wave and the second reflected radio wave is circular polarization, and a rotational direction of a polarization plane of the first reflected radio wave differs from a rotational direction of a polarization plane of the second reflected radio wave.

(5)

The radar apparatus according to any one of (1) to (4), in which the reflected radio waves include a third reflected radio wave whose polarization characteristic differs from the polarization characteristic of the first reflected radio wave and the polarization characteristic of the second reflected radio wave, and the reception unit further includes a third receiver configured to receive the third reflected radio wave.

(6)

The radar apparatus according to any one of (1) to (5), in which the radio waves include a first radio wave and a second radio wave having different polarization characteristics from each other, and the transmission unit includes a first transmitter configured to transmit the first radio wave and a second transmitter configured to transmit the second radio wave.

(7)

The radar apparatus according to (6), in which the control unit is configured to control the operation of the transmission unit to cause the first transmitter to operate in a first period and the second transmitter to operate in a second period, and is configured to control the operation of the reception unit to cause both the first receiver and the second receiver to operate in the first period and the second period.

(8)

The radar apparatus according to (6) or (7), in which the control unit is configured to identify the detection target on the basis of information as to which of the first transmitter and the second transmitter is operating, the first reception level, and the second reception level.

(9)

A radar apparatus including:

a transmission unit including a first transmitter configured to transmit a first radio wave and a second transmitter configured to transmit a second radio wave, the first radio wave and the second radio wave having different polarization characteristics from each other;

a reception unit configured to receive reflected radio waves that are radio waves reflected by a detection target, the radio waves including the first radio wave and the second radio wave; and a control unit configured to control operations of the transmission unit and the reception unit, and configured to identify the detection target on the basis of information as to which of the first transmitter and the second transmitter is operating, and a reception level at the reception unit.

(10)

A radar control apparatus configured to perform:

a first control operation of controlling an operation of a transmission unit configured to transmit radio waves;

a second control operation of controlling an operation of a reception unit including a first receiver configured to receive a first reflected radio wave and a second receiver configured to receive a second reflected radio wave, the first reflected radio wave and the second reflected radio wave having different polarization characteristics from each other and being included in reflected radio waves that are the radio waves reflected by a detection target; and an identification operation of identifying the detection target on the basis of the operation of the transmission unit, a first reception level at the first receiver, and a second reception level at the second receiver.

(11)

A radar system including:

a radar apparatus; and a reflector provided for a detection target of the radar apparatus, the radar apparatus including a transmission unit configured to transmit radio waves;

a reception unit including a first receiver configured to receive a first reflected radio wave and a second receiver configured to receive a second reflected radio wave, the first reflected radio wave and the second reflected radio wave having different polarization characteristics from each other and being included in reflected radio waves that are the radio waves reflected by the reflector; and a control unit configured to control operations of the transmission unit and the reception unit, and configured to identify the detection target on the basis of the operation of the transmission unit, a first reception level at the first receiver, and a second reception level at the second receiver.

This application claims the benefit of Japanese Priority Patent Application No. 2018-075865 filed with the Japan Patent Office on Apr. 11, 2018, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A radar apparatus comprising:
a transmission unit configured to transmit radio waves;
a reception unit including a first receiver configured to receive a first reflected radio wave and a second receiver configured to receive a second reflected radio wave, wherein the first reflected radio wave and the second reflected radio wave are included in reflected radio waves that are the radio waves reflected by a detection target, and wherein there is a change in an original polarization characteristic of at least one of the first reflected radio wave and the second reflected radio wave; and
a control unit configured to control operations of the transmission unit and the reception unit, and configured to identify the detection target on a basis of the operation of the transmission unit, a first reception level at the first receiver, and a second reception level at the second receiver.

2. The radar apparatus according to claim 1,
wherein the detection target includes a reflector configured to change polarization characteristics of the radio waves, and
wherein the reflected radio waves are the radio waves reflected by the reflector.

3. The radar apparatus according to claim 1,
wherein polarization of the first reflected radio wave and the second reflected radio wave is linear polarization, and
wherein an orientation of a polarization plane of the first reflected radio wave differs from an orientation of a polarization plane of the second reflected radio wave.

4. The radar apparatus according to claim 1,
wherein polarization of the first reflected radio wave and the second reflected radio wave is circular polarization, and
wherein a rotational direction of a polarization plane of the first reflected radio wave differs from a rotational direction of a polarization plane of the second reflected radio wave.

5. The radar apparatus according to claim 1,
wherein the reflected radio waves include a third reflected radio wave whose polarization characteristic differs from the polarization characteristic of the first reflected radio wave and the polarization characteristic of the second reflected radio wave, and
wherein the reception unit further includes a third receiver configured to receive the third reflected radio wave.

6. The radar apparatus according to claim 1,
wherein the radio waves include a first radio wave and a second radio wave having different polarization characteristics from each other, and
wherein the transmission unit includes a first transmitter configured to transmit the first radio wave and a second transmitter configured to transmit the second radio wave.

7. The radar apparatus according to claim 6, wherein the control unit is configured to control the operation of the transmission unit to cause the first transmitter to operate in a first period and the second transmitter to operate in a second period, and is configured to control the operation of the reception unit to cause both the first receiver and the second receiver to operate in the first period and the second period.

8. The radar apparatus according to claim 6, wherein the control unit is configured to identify the detection target on a basis of information as to which of the first transmitter and the second transmitter is operating, the first reception level, and the second reception level.

9. A radar apparatus comprising:
a transmission unit including a first transmitter configured to transmit a first radio wave and a second transmitter configured to transmit a second radio wave, the first radio wave and the second radio wave having different polarization characteristics from each other;
a reception unit configured to receive reflected radio waves that are radio waves reflected by a detection target, the radio waves including the first radio wave and the second radio wave, wherein there is a change in an original polarization characteristic of at least one of the first radio wave and the second radio wave after being reflected; and
a control unit configured to control operations of the transmission unit and the reception unit, and configured to identify the detection target on a basis of information as to which of the first transmitter and the second transmitter is operating, and a reception level at the reception unit.

10. A radar control apparatus configured to perform:
a first control operation of controlling an operation of a transmission unit configured to transmit radio waves;
a second control operation of controlling an operation of a reception unit including a first receiver configured to receive a first reflected radio wave and a second receiver configured to receive a second reflected radio wave, wherein the first reflected radio wave and the second reflected radio wave are included in reflected radio waves that are the radio waves reflected by a detection target, and wherein there is a change in an original polarization characteristic of at least one of the first reflected radio wave and the second reflected radio wave; and
an identification operation of identifying the detection target on a basis of the operation of the transmission unit, a first reception level at the first receiver, and a second reception level at the second receiver.

11. A radar system comprising:
a radar apparatus; and
a reflector provided for a detection target of the radar apparatus,
the radar apparatus including
a transmission unit configured to transmit radio waves;
a reception unit including a first receiver configured to receive a first reflected radio wave and a second receiver configured to receive a second reflected radio wave, wherein the first reflected radio wave and the second reflected radio wave are included in reflected radio waves that are the radio waves reflected by the reflector, and wherein there is a change in an original polarization characteristic of at least one of the first reflected radio wave and the second reflected radio wave; and
a control unit configured to control operations of the transmission unit and the reception unit, and configured to identify the detection target on a basis of the operation of the transmission unit, a first reception level at the first receiver, and a second reception level at the second receiver.

12. The radar apparatus according to claim 2, wherein the reflector includes a liquid crystal device that changes an orientation of a polarization plane of the radio waves.

13. The radar apparatus according to claim 12, wherein a rotational angle of the polarization plane in the liquid crystal device is adjustable.

14. The radar apparatus according to claim 13, wherein adjusting the rotational angle of the polarization plane in the liquid crystal device comprises changing a voltage applied to the liquid crystal device.

15. The radar apparatus according to claim 1, wherein the detection target includes a reflector, wherein the reflector includes:
a vertically polarized antenna;
an amplifier; and
a horizontally polarized antenna.

16. The radar apparatus according to claim 1, wherein the detection target includes a reflector, wherein the reflector includes:
a vertically polarized antenna;
an amplifier;
a phase shifter; and
an antenna.

17. The radar apparatus according to claim 1, wherein the detection target includes a reflector configured to change polarization characteristics of the radio waves, wherein the reflector includes:
a Faraday rotator that rotates an orientation of a polarization plane of the radio waves; and
a reflective member that reflects the radio waves to the reception unit.

18. The radar apparatus according to claim 2,
wherein a type of the reflector may be determined based on how the polarization characteristics of the reflected radio waves are changed.

* * * * *